US009275169B2

(12) United States Patent
Bonnet et al.

(10) Patent No.: US 9,275,169 B2
(45) Date of Patent: *Mar. 1, 2016

(54) DATA DETECTION

(71) Applicant: Apple Inc., Cupertino, CA (US)

(72) Inventors: Olivier Bonnet, Paris (FR); Frederic de Jaeger, Paris (FR); Romain Goyet, Paris (FR)

(73) Assignee: Apple Inc., Cupertino, CA (US)

( * ) Notice: Subject to any disclaimer, the term of this patent is extended or adjusted under 35 U.S.C. 154(b) by 421 days.

This patent is subject to a terminal disclaimer.

(21) Appl. No.: 13/670,052

(22) Filed: Nov. 6, 2012

(65) Prior Publication Data
US 2013/0091174 A1   Apr. 11, 2013

Related U.S. Application Data

(63) Continuation of application No. 12/240,671, filed on Sep. 29, 2008, now Pat. No. 8,311,806.

(60) Provisional application No. 61/059,722, filed on Jun. 6, 2008.

(51) Int. Cl.
G06F 17/27     (2006.01)
G06F 17/30     (2006.01)

(52) U.S. Cl.
CPC .......... *G06F 17/30961* (2013.01); *G06F 17/27* (2013.01); *G06F 17/271* (2013.01); *G06F 17/2705* (2013.01)

(58) Field of Classification Search
CPC ... G06F 17/27; G06F 17/2705; G06F 17/271; G06F 17/30961
See application file for complete search history.

(56) References Cited

U.S. PATENT DOCUMENTS

| | | | |
|---|---|---|---|
| 4,227,245 A | 10/1980 | Edblad et al. |
| 4,791,556 A | 12/1988 | Vilkaitis |
| 4,818,131 A | 4/1989 | Sakai |
| 4,873,662 A | 10/1989 | Sargent |
| 4,907,285 A | 3/1990 | Nakano et al. |
| 4,965,763 A | 10/1990 | Zamora |
| 5,034,916 A | 7/1991 | Ordish |
| 5,146,406 A | 9/1992 | Jensen |
| 5,155,806 A | 10/1992 | Hoeber et al. |
| 5,157,736 A | 10/1992 | Boyer et al. |
| 5,182,709 A | 1/1993 | Makus |
| 5,189,632 A | 2/1993 | Paajanen et al. |
| 5,283,856 A | 2/1994 | Gross et al. |
| 5,299,261 A | 3/1994 | Bogart et al. |
| 5,301,350 A | 4/1994 | Rogan et al. |
| 5,346,516 A | 9/1994 | Alkhas et al. |
| 5,369,778 A | 11/1994 | San Soucie et al. |
| 5,375,200 A | 12/1994 | Dugan et al. |
| 5,390,281 A | 2/1995 | Luciw et al. |
| 5,398,336 A | 3/1995 | Tantry et al. |
| 5,418,717 A | 5/1995 | Su et al. |
| 5,424,947 A | 6/1995 | Nagao et al. |
| 5,434,777 A | 7/1995 | Luciw |
| 5,437,036 A | 7/1995 | Stamps et al. |
| 5,442,742 A | 8/1995 | Greyson et al. |
| 5,463,772 A | 10/1995 | Thompson et al. |
| 5,477,447 A | 12/1995 | Luciw et al. |
| 5,483,352 A | 1/1996 | Fukuyama et al. |
| 5,572,643 A | 11/1996 | Judson |
| 5,583,921 A | 12/1996 | Hidaka |
| 5,604,897 A | 2/1997 | Travis |
| 5,608,624 A | 3/1997 | Luciw |
| 5,610,812 A | 3/1997 | Schabes et al. |
| 5,621,658 A | 4/1997 | Jackson et al. |
| 5,621,903 A | 4/1997 | Luciw et al. |
| 5,627,948 A | 5/1997 | Fukunaga |
| 5,634,124 A | 5/1997 | Khoyi et al. |
| 5,642,435 A | 6/1997 | Loris |
| 5,644,735 A | 7/1997 | Luciw et al. |
| 5,649,222 A | 7/1997 | Mogilevsky |

(Continued)

FOREIGN PATENT DOCUMENTS

EP   0 458 563 A2   11/1991
EP   0 458 563 B1   11/1991

(Continued)

OTHER PUBLICATIONS

Shawn Willett, T. Quinlan, "Novell seeking object framework for NetWare," News/Networking,LexisNexis, Info World Media Group, May 2, 1994, pp. 45.

Charles Babcock, "A matter of choice: Charting an object-oriented course depends on what you want to do when," CSJ, Object Technology, LexiNexis, ComputerWorld, May 1, 1994, pp. 59.

Tom Quinlan, Novell eyes larger role in OpenDoc: WordPerfect purchase fuels push, Top of the News, LexisNexis, Info World Media Group, Apr. 11, 1994, pp. 1.

(Continued)

*Primary Examiner* — Samuel G Neway
(74) *Attorney, Agent, or Firm* — Blakely, Sokoloff, Taylor & Zafman LLP

(57) ABSTRACT

An apparatus for processing a sequence of tokens to detect predetermined data, wherein each said token has a token type, and the predetermined data has a structure that comprises a predetermined sequence of token types, including at least one optional token type. The apparatus comprises a processor arranged to: provide a tree for detecting the predetermined data, the tree comprising a plurality of states, each said state being linked with at least one other state by a respective condition, the arrangement of linked states forming a plurality of paths; and compare the token types of the sequence of tokens to respective conditions in the tree to match the sequence of tokens to one or more paths in the tree, wherein the predetermined data can be detected without using an epsilon reduction to take account of said at least one optional token type.

14 Claims, 8 Drawing Sheets

(56) References Cited

U.S. PATENT DOCUMENTS

| | | | |
|---|---|---|---|
| 5,666,552 A | 9/1997 | Greyson et al. | |
| 5,687,333 A | 11/1997 | Dobashi et al. | |
| 5,692,032 A | 11/1997 | Seppanen et al. | |
| 5,708,845 A | 1/1998 | Wistendahl et al. | |
| 5,732,229 A | 3/1998 | Dickinson | |
| 5,737,734 A | 4/1998 | Schultz | |
| 5,787,432 A | 7/1998 | Le Tourneau | |
| 5,790,875 A | 8/1998 | Andersin et al. | |
| 5,794,142 A | 8/1998 | Vanttila et al. | |
| 5,799,268 A | 8/1998 | Boguraev | |
| 5,806,032 A | 9/1998 | Sproat | |
| 5,815,138 A | 9/1998 | Tsubaki et al. | |
| 5,815,142 A | 9/1998 | Allard et al. | |
| 5,838,458 A | 11/1998 | Tsai | |
| 5,838,906 A | 11/1998 | Doyle et al. | |
| 5,859,636 A | 1/1999 | Pandit | |
| 5,862,395 A | 1/1999 | Bier | |
| 5,864,789 A | 1/1999 | Lieberman et al. | |
| 5,900,005 A | 5/1999 | Saito | |
| 5,906,656 A | 5/1999 | Keller et al. | |
| 5,946,629 A | 8/1999 | Sawyer et al. | |
| 5,946,647 A | 8/1999 | Miller et al. | |
| 5,966,652 A | 10/1999 | Coad et al. | |
| 5,987,029 A | 11/1999 | Kotani et al. | |
| 5,995,106 A | 11/1999 | Naughton et al. | |
| 6,026,233 A | 2/2000 | Shulman et al. | |
| 6,034,689 A | 3/2000 | White et al. | |
| 6,044,250 A | 3/2000 | Kuramatsu et al. | |
| 6,049,796 A | 4/2000 | Siitonen et al. | |
| 6,115,710 A | 9/2000 | White | |
| 6,125,281 A | 9/2000 | Wells et al. | |
| 6,212,494 B1 | 4/2001 | Boguraev | |
| 6,222,549 B1 | 4/2001 | Hoddie | |
| 6,249,283 B1 | 6/2001 | Ur | |
| 6,262,735 B1 | 7/2001 | Etelaperä | |
| 6,272,455 B1 | 8/2001 | Hoshen et al. | |
| 6,272,495 B1 | 8/2001 | Hetherington | |
| 6,282,435 B1 | 8/2001 | Wagner et al. | |
| 6,323,853 B1 | 11/2001 | Hedloy | |
| 6,374,210 B1 | 4/2002 | Chu | |
| 6,460,058 B2 | 10/2002 | Koppolu et al. | |
| 6,499,132 B1* | 12/2002 | Morley et al. | 716/103 |
| 6,608,637 B1 | 8/2003 | Beaton et al. | |
| 6,622,306 B1 | 9/2003 | Kamada | |
| 6,678,706 B1 | 1/2004 | Fishel | |
| 6,711,624 B1 | 3/2004 | Narurkar et al. | |
| 6,714,905 B1 | 3/2004 | Chang et al. | |
| 6,714,941 B1 | 3/2004 | Lerman et al. | |
| 6,785,643 B2 | 8/2004 | Hayosh et al. | |
| 6,920,583 B1 | 7/2005 | Morley et al. | |
| 6,944,132 B1 | 9/2005 | Acno et al. | |
| 6,944,588 B2 | 9/2005 | Kempe | |
| 6,990,442 B1 | 1/2006 | Davis | |
| 7,006,881 B1 | 2/2006 | Hoffberg et al. | |
| 7,010,476 B2 | 3/2006 | Karttunen et al. | |
| 7,027,988 B1 | 4/2006 | Mohri | |
| 7,383,185 B1 | 6/2008 | Mohri | |
| 7,467,181 B2 | 12/2008 | McGowan et al. | |
| 7,627,567 B2 | 12/2009 | Ganti et al. | |
| 7,630,892 B2 | 12/2009 | Wu et al. | |
| 7,702,677 B2 | 4/2010 | Chang et al. | |
| 8,311,806 B2* | 11/2012 | Bonnet et al. | 704/9 |
| 2002/0194379 A1 | 12/2002 | Bennett et al. | |
| 2004/0024584 A1 | 2/2004 | Brill | |
| 2004/0042591 A1 | 3/2004 | Geppert et al. | |
| 2004/0172234 A1* | 9/2004 | Dapp et al. | 704/1 |
| 2005/0022115 A1 | 1/2005 | Baumgartner et al. | |
| 2005/0108001 A1 | 5/2005 | Aarskog | |
| 2005/0125746 A1 | 6/2005 | Viola et al. | |
| 2005/0234701 A1 | 10/2005 | Graehl et al. | |
| 2006/0069545 A1 | 3/2006 | Wu et al. | |
| 2006/0235811 A1 | 10/2006 | Fairweather | |
| 2007/0282900 A1 | 12/2007 | Owens et al. | |
| 2008/0071520 A1 | 3/2008 | Sanford | |
| 2008/0243470 A1* | 10/2008 | Iwashita | 703/27 |
| 2008/0293383 A1 | 11/2008 | Rastas | |
| 2009/0006994 A1 | 1/2009 | Forstall et al. | |
| 2009/0106183 A1* | 4/2009 | Estan et al. | 706/48 |
| 2009/0235280 A1 | 9/2009 | Tannier et al. | |
| 2009/0292690 A1 | 11/2009 | Culbert | |
| 2013/0091174 A1* | 4/2013 | Bonnet et al. | 707/797 |

FOREIGN PATENT DOCUMENTS

| | | |
|---|---|---|
| EP | 0458563 A2 | 11/1991 |
| EP | 0635808 A2 | 1/1995 |
| EP | 0 698 845 A1 | 2/1996 |
| EP | 0458563 B1 | 7/1996 |
| EP | 0 698 845 B1 | 1/2001 |
| EP | 0458563 B2 | 7/2001 |
| JP | 3046855 A | 2/1991 |
| JP | 10040014 A | 2/1998 |
| JP | 11088633 A | 3/1999 |
| WO | 95/34998 A2 | 12/1995 |
| WO | 95/34998 A3 | 12/1995 |
| WO | WO 95/34998 | 12/1995 |
| WO | WO 97/32439 | 9/1997 |
| WO | WO 99/66747 | 12/1999 |
| WO | WO 2008/109835 A2 | 9/2008 |
| WO | WO 2009/041982 A1 | 4/2009 |

OTHER PUBLICATIONS

Melinda-Carol Ballou, CW Staff, "Object technologies draw good reviews: Some cite shortcomings in Microsoft model," Application Development, LexisNexis, ComputerWorld, Mar. 21, 1994, pp. 91.
Newsbytes, Watcom Launches New C/C++ Tools, Deals, LexisNexis, Post-Newsweek Business Information Inc., Mar. 17, 1994, Waterloo, Ontario, Canada.
Bob Metcalfe, "Platform Olympic teams converge on CORBA?," From the Ether, LexisNexis, Info World Media Group, Mar. 7, 1994.
Newsbytes, "Object World—IBM's SOM is Stepping Stone to Taligent," LexisNexis, Post-Newsweek Business Information Inc., Boston, MA., Jan. 18, 1994.
Newsbytes, "Object World—DEC Presents Plans for OLE & COM," LexisNexis, Post-Newsweek Business Information Inc., Boston, MA., Jan. 18, 1994.
John Blackford, "IBM offers a peek at tomorrow's software: marketing strategy for OS/2 operating system," Direct from the editor, Column, LexisNexis, Gale Group, vol. 14 No. 1,Jan. 1, 1994, pp. 58.
Willem Knibbe, "Microsoft, DEC craft object model: Claims of object access across nine platforms raise vendors' eyebrows," LexisNexis, Info World Media Group, Dec. 6, 1993, pp. 1.
Ed Scannell, V. McCarthy, "Object System to aid corporate downsizing," News: PC Expo, LexisNexis, Info World Media Group, Jul. 5, 1993, pp. 8.
Robert Welland, G. Seitz, L. Wang, L. Dyer, T. Harrington, D. Culbert, "The Newton Operating System," To appear in Proceedings of the 1994 IEEE Computer Conference, IEEE, San Francisco, CA, 1994, pp. 8.
Apple Computer Inc., Newton Programmer's Guide: System Software, vol. 2, First Edition, 1995, Apple Inc., Cupertino, CA.
Milind S. Pandit, S. Kalbag, "The selection recognition agent: instant access to relevant information and operations," IUI '97 Proceedings of the 2nd international conference on Intelligent user interfaces, ACM, New York, NY, 1997, pp. 47-52.
Melinda-Carol Ballou, CW Staff, "Through cooperation come standards," Appl/Dev, ComputerWorld, May 16, 1994, pp. 85.
L. Nancy Garrett, K.E. Smith, N. Meyrowitz, "Intermedia: issues, strategies, and tactics in the design of a hypermedia document system," CSCW '86 Proceedings of the 1986 ACM conference on Computer-supported cooperative work, ACM, New York, NY, 1986, pp. 163-174.
Nokia Corporation, "Nokia 2110: User's Guide," Nokia Mobile Phones, 1994, pp. 52.
Microsoft Corporation, "User's Guide Microsoft Word: The World's Most Popular Word Processor version 6.0," Microsoft Corporation, 1993, pp. 606.
Kenneth W. Church, L.F. Rau, "Commercial applications of natural language processing," Communications of the ACM CACM Homepage archive vol. 38 Issue 11, Nov. 1995, ACM, New York, NY, pp. 71-79.

(56) References Cited

OTHER PUBLICATIONS

Apple Computer Inc., Newton Programmer's Guide: System Software, vol. 1, First Edition, 1995, Apple Inc., Cupertino, CA.
Apple Computer Inc., "Revision to the Mar. 14, 1993 developer confidential price list," Apple Computer Inc, Cupertino, CA, Apr. 25, 1995, pp. 24.
Apple Computer Inc., "Revision to the Aug. 2, 1994 developer confidential price list," Apple Computer Inc, Cupertino, CA, Sep. 12, 1994, pp. 25.
Jeanette Borzo, T. Quinlan, "WordPerfect and Novell plan to adopt OpenDoc: Apple architecture lets users read, edit document across patforms," News: PC Expo, LexisNexis, Info World Media Group, New York, NY, July 5, 1993, pp. 8.
Exhibit 647-1 (Nov. 24, 2010), Claim Chart "Perspective System," References cited: Perspective Source Code 1992-93 (Code), Pensoft Corporation, Perspective Handbook, Nov. 1992 (Handbook), pp. 46.
Exhibit 647-3 (Nov. 24, 2010), Claim Chart "Spellchecking Systems," References cited: Larry Koved and Ben Shneiderman, Embedded Menus: Selecting Items in Context, Communications of the ACM, vol. 29, No. 4. p. 312-318. Apr. 1986. (Koved), U.S. Pat. No. 5,437,036 to Microsoft, Text checking application programming interface (036 Patent), U.S. Pat. No. 5,604,897 to Microsoft, Method and system for correcting the spelling of misspelled words (897 Patent), NeXT Computer, Inc., NeXTSTEP General Reference—Release 3, vol. 1 (1992) (Reference), NeXT Computer, Inc., NeXTSTEP General Reference—Release 3, vol. 2 (1992) (Reference 2), pp. 32.
Exhibit 647-4 (Nov. 24, 2010), Claim Chart "WordPerfect," Reference cited: Novell, WordPerfect User's Guide (MAC), V 3.1, 1994 (WP Users Guide), NeXT Computer, Inc., "NeXTSTEP General Reference—Release 3, vol. 1" (1992) ("Reference"), NeXT Computer, Inc., "NeXTSTEP General Reference—Release 3, vol. 2" (1992) ("Reference 2"), pp. 33.
Exhibit 647-5 (Nov. 24, 2010), Claim Chart "Selection Recognition Agent," References cited: U.S. Pat. No. 5,859,636 to Intel Corporation (filed Dec. 27, 1995) ("Pandit"), Milind S. Pandit and Sameer Kalbag, The Selection Recognition Agent: Instant Access to Relevant Information and Operations, ACM 1997 (SRA), U.S. Pat. No. 5,437,036 to Microsoft Corporation (filed Sep. 3, 1992) (Stamps), Gerald Salton, Automatic Text Processing: The Transformation, Analysis, and Retrieval of Information by Compuer, 1989 (Salton), U.S. Pat. No. 5,649,222 to Microsoft Corporation (filed May 8, 1995) (Mogilevsky), Koved and Ben Shneiderman, Embedded Menus: Selecting Items In Context (Communications of the ACM, vol. 29 No. 4 Apr. 1986) (Koved), pp. 39.
Exhibit 647-7 (Nov. 24, 2010), Claim Chart "European Patent Office Publication No. 0 458 563 A2," References cited: European Patent Office Publication No. 0 458 563 A2 to Nokia Mobile Phones Ltd (published Nov. 27, 1991) (NokiaEP563), U.S. Pat. No. 5,437,036 to Microsoft Corporation (filed Sep. 3, 1992) (Stamps), U.S. Pat. No. 5,649,222 to Microsoft Corporation (filed May 8, 1995) (Migilevsky), Koved and Ben Schneiderman, Embedded Menus: Selecting Items In Context (Communications of the ACM, vol. 29 No. 4 Apr. 1986) (Koved), pp. 20.
Exhitbit 647-8 (Nov. 24, 2010), Claim Chart "NeXTSTEP Release 3," References cited: NeXT Computer, Inc., NeXTSTEP General Reference—Release 3, vol. 1, (1992) (Reference), NeXT Computer, Inc., NeXTSTEP General Reference—Release 3, vol. 2 (1992) (Reference 2), Video, Steve Jobs Demos NeXTSTEP (Steve Jobs Demo), Larry Koved and Ben Shneiderman, Embedded Menus: Selecting Items in Context, Communications of the ACM, vol. 29, No. 4. p. 312-318, Apr. 1986, (Koved), pp. 35.
Exhibit 647-10 (Nov. 24, 2010), Claim Chart "Apple Newton", References cited: Apple Computer, Inc., Newton Programmer's Guide, 1993 (Guide), Apple Computer, Inc., Newton Programmer's Guide for Newton 2.0, 1996 (Guide 2), Pensoft Corporation, Perspective Handbook, Nov. 1992 (Handbook), pp. 44.
Exhibit 647-13 (Nov. 24, 2010), Claim Chart "U.S. Pat. No. 5,483,352," References cited: U.S. Pat. No. 5,483,352 assigned to Fujitsu (Fukuyama at filing date Aug. 26, 1993) (Fukuyama), pp. 19.

Exhibit 647-15 (Nov. 24, 2010), Claim Chart "GNU Emacs—goto-addr.el," References cited: Eric Ding, GNU Emacs: goto-addr.el extension, Aug. 15, 1995 (goto-addr), Larry Koved and Ben Shneiderman, Embedded Menus: Selecting Items in Context, Communications of the ACM, vol. 29, No. 4. p. 312-318. Apr. 1986. (Koved), pp. 17.
Exhibit 647-16 (Nov. 24, 2010), Claim Chart "Eager," References cited: Allen Cypher, Programming Repetitive Tasks by Example, 1991 (Eager), Eager Video by Allen Cypher (Eager Video), Edited by Allen Cypher, Watch What I do: Programming by Example, (1993) (Watch What I Do), U.S. Pat. No. 5,859,636 to Intel Corporation (filed Dec. 27, 1995) (Pandit), General Salton, Automatic Text Processing: The Transformation, Analysis, and Retrieval of Information by Computer, 1989 (Salton), pp. 24.
Nokia Supplemental Response to Interrogatories (Nov. 17, 2010): Invalidity Claim Charts based on U.S. Pat. No. 5,859,636; Newton Apple Message Pad Handbook; U.S. Pat. No. 5,434,777; U.S. Pat. No. 5,477,447; U.S. Pat. No. 5,815,142; U.S. Pat. No. 5,483,352; and EP0458563.
Apple Computer Inc., "Revision to the Oct. 17, 1994 collegiate partnership program level 1 confidential price list," Apple Computer Inc, Cupertino, CA, Nov. 14, 1994, pp. 26.
Exhibit 647-1, Claim Chart "Perspective System," References cited: Perspective Source Code 1993-93 (Code), Pensoft Corporation, Perspective Handbook, Nov. 1992 (Handbook), pp. 46.
Exhibit 647-10, Claim Chart "Apple Newton", References cited: Apple Computer, Inc., Newton Programmer's Guide, 1993 (Guide), Apple Computer, Inc., Newton Programmer's Guide for Newton 2.0, 1996 (Guide 2), Pensoft Corporation, Perspective Handbook, Nov. 1992 (Handbook), pp. 44.
Exhibit 647-13, Claim Chart "U.S. Pat. No. 5,483,352," References cited: U.S. Pat. No. 5,483,352 assigned to Fujitsu (Fukuyama at filing date Aug. 26, 1993) (Fukuyama), pp. 19.
Exhibit 647-15, Claim Chart "GNU Emacs—goto-addr.el," References cited: Eric Ding, GNU Emacs: goto-addr.el extension, Aug. 15, 1995 (goto-addr), Larry Koved and Ben Shneiderman, Embedded Menus: Selecting Items in Context, Communications of the ACM, vol. 29, No. 4. p. 312-318. Apr. 1986. (Koved), pp. 17.
Exhibit 647-16, Claim Chart "Eager," References cited: Allen Cypher, Programming Repetitive Tasks by Example, 1991 (Eager), Eager Video by Allen Cypher (Eager Video), Edited by Allen Cypher, Watch What I do: Programming by Example, (1993) (Watch What I Do), U.S. Pat. No. 5,859,636 to Intel Corporation (filed Dec. 27, 1995) (Pandit), Gerald Salton, Automatic Text Processing: The Transformation, Analysis, and Retrieval of Information by Computer, 1989 (Salton), pp. 24.
Exhibit 647-3, Claim Chart "Spellchecking Systems," References cited: Larry Koved and Ben Shneiderman, Embedded Menus: Selecting Items in Context, Communications of the ACM, vol. 29, No. 4. p. 312-318. Apr. 1986. (Koved), U.S. Pat. No. 5,437,036 to Microsoft, Text checking application programming interface (036 Patent), U.S. Pat. No. 5,604,897 to Microsoft, Method and system for correcting the spelling of misspelled words (897 Patent), NeXT Computer, Inc., NeXTSTEP General Reference—Release 3, vol. 1 (1992) (Reference), NeXT Computer, Inc., NeXTSTEP General Reference—Release 3, vol. 2 (1992) (Reference 2), pp. 32.
Exhibit 647-4, Claim Chart "WordPerfect," Reference cited: Novell, WordPerfect User's Guide (MAC), V 3.1, 1994 (WP Users Guide), NeXT Computer, Inc., "NeXTSTEP General Reference—Release 3, vol. 1" (1992) ("Reference"), NeXT Computer, Inc., "NeXTSTEP General Reference—Release 3, vol. 2" (1992) ("Reference 2"), pp. 33.
Exhibit 647-5, Claim Chart "Selection Recognition Agent," References cited: U.S. Pat. No. 5,859,636 to Intel Corporation (filed Dec. 27, 1995) ("Pandit"), Milind S. Pandit and Sameer Kalbag, The Selection Recognition Agent: Instant Access to Relevant Information and Operations, ACM 1997 (SRA), U.S. Pat. No. 5,437,036 to Microsoft Corporation (filed Sep. 3, 1992) (Stamps), Gerald Salton, Automatic Text Processing: The Transformation, Analysis, and Retrieval of Information by Computer, 1989 (Salton), U.S. Pat. No. 5,649,222 to Microsoft Corporation (filed May 8, 1995) (Mogilevsky), Koved and Ben Shneiderman, Embedded Menus:

(56) References Cited

OTHER PUBLICATIONS

Selecting Items In Context (Communications of the ACM, vol. 29 No. 4 Apr. 1986) (Koved), pp. 39.
Exhibit 647-7, Claim Chart "European Patent Office Publication No. 0 458 563 A2," References cited: European Patent Office Publication No. 0 458 563 A2 to Nokia Mobile Phones Ltd (published Nov. 27, 1991) (NokiaEP563), U.S. Pat. No. 5,437,036 to Microsoft Corporation (filed Sep. 3, 1992) (Stamps), U.S. Pat. No. 5,649,222 to Microsoft Corporation (filed May 8, 1995) (Migilevsky), Koved and Ben Shneiderman, Embedded Menus: Selecting Items In Context (Communications of the ACM, vol. 29 No. 4 Apr. 1986) (Koved), pp. 20.
Exhibtit 647-8, Claim Chart "NeXTSTEP Release 3," References cited: NeXT Computer, Inc., NeXTSTEP General Reference—Release 3, vol. 1, (1992) (Reference), NeXT Computer, Inc., NeXTSTEP General Reference—Release 3, vol. 2 (1992) (Reference 2),Video, Steve Jobs Demos NeXTSTEP (Steve Jobs Demo), Larry Koved and Ben Shneiderman, Embedded Menus: Selecting Items in Context, Communications of the ACM, vol. 29, No. 4. p. 312-318, Apr. 1986, (Koved), pp. 35.
Exhibit 647-11, Claim Chart "Netscape Navigator," References cited: Netscape Navigator version 1.0, Dec. 1994 (Netscape 1.0), Netscape Navigator version 1.1, Mar. 1995 (Netscape 1.1), http://graphcomp.com/info/specs/nets/ddeapi.html, Apr. 1995 (DDE), pp. 18.
Exhibit 647-12, Claim Chart "More Command in 4.3BSD," References cited: University of California, Berkeley, BSD General Commands Manual—More Command in 4.3BSD, Jul. 24, 1990 (Manual), 4.3BSD-Reno Source Code, comp. archives (USENET newsgroup), Jul. 6, 1990, (Code), Samuel J. Leffler, Marshall Kirk McKusick, Michael J. Karels, and John S. Quarterman, The Design and Implementation of the 4.3BSD UNIX Operating System, Nov. 1989 (Leffler), pp. 18.
Exhibit 647-14, Claim Chart "GNU Emacs," References cited: GNU Emacs (Version 18.59) Source Code, Oct. 31, 1992 (EmacsSrc), Michael A. Schoonover, John S. Bowie, William R. Arnold, GNU Emacs: UNIX Text Editing and Programming, 1992 (Schoonover), pp. 33.
Exhibit 647-17, Claim Chart "HieNet System," References cited: Daniel T. Chang, HieNet: A User-Centered Approach for Automatic Link Generation, 1993 (Chang), U.S. Pat. No. 5,437,036 to Microsoft Corporation (filed Sep. 3, 1992) (Stamps), U.S. Pat. No. 5,859,636 to Intel Corporation (filed Dec. 27, 1995) (Pandit), Gerald Salton, Automatic Text Processing: The Transformation, Analysis, and Retrieval of Information by Computer, 1989 (Salton), U.S. Pat. No. 5,649,222 to Microsoft Corporation (filed May 8, 1995) (Mogilevsky), Koved and Ben Shneiderman, Embedded Menus: Selecting Items In Context (Communications of the ACM, vol. 29 No. 4 Apr. 1986) (Koved), pp. 27.
Exhibit 647-2, Claim Chart "Vi in 4.3BSD," References cited: University of California, Berkeley, BSD General Commands Manual—Vi, in 4.3BSD, Jul. 24, 1990 (Manual), University of California, Berkeley, BSD General Commands Manual—Ex, in 4.3BSD, Jul. 24, 1990 (Ex), University of California, Berkeley, BSD General Commands Manual—Ed, in 4.3BSD, Jul. 24, 1990 (Ed), William Joy and Mark Horton, Introduction to Display Editing in Vi, 1982 (Joy), 4.3BSD-Reno Source Code, comp.archives (USENET newsgroup), Jul. 6, 1990. (Code), Samuel J. Leffler, Marshall Kirk McKusick, Michael J. Karels, and John S. Quarterman, The Design and Implementation of the 4.3BSD UNIX Operating System, Nov. 1989 (Leffler), pp. 22.
Exhibit 647-6, Claim Chart "OPENSTEP," References cited: NeXT Computer, Inc., OPENSTEP Specification, Oct. 19, 1994 (Specification), pp. 23.
Exhibit 649-9, Claim Chart "NeXTSTEP Release 3—Project Application Builder," References cited: NeXT Computer, Inc., NeXTSTEP Development Tools and Techniques—The Project Application Builder Oct. 1992 (Project Builder), NeXT Computer, Inc., NeXTSTEP Development Tools and Techniques—The Project Application Builder Oct. 1992 (C Compiler), Video, Steve Jobs Demos NeXTSTEP (Steve Jobs Demo), NeXT Computer, Inc., NeXTSTEP General Reference—Release 3, vol. 1 (1992) (Reference), NeXT Computer, Inc. , NeXTSTEP General Reference—Release 3, vol. 2 (1992) (Reference 2), pp. 22.
Appendix 10, Claim Chart "U.S. Pat. No. 5,483,352," References cited: U.S. Pat. No. 5,483,352 (filed Aug. 26, 1993) (Fukuyama), Gerald Salton, Automatic Text Processing: The Transformation, Analysis, and Retrieval of Information by Computer (Michael A. Harrison ed., Addison-Wesley 1989) (Salton), pp. 33.
Appendix 11, Claim Chart "Koved," References cited: Larry Koved & Ben Shneiderman, Embedded Menus: Selecting Items in Context, vol. 29, No. 4., Ass'n for Computing Machining, 312 (1986) (Koved), U.S. Pat. No. 5,437,036 (filed Sep. 3, 1992) (Stamps), Gerald Salton, Automatic Text Processing: The Transformation Analysis, and Retrieval of Information by Computer (Michael A. Harrison ed., Addison-Wesley 1989),NeXT Publications, NeXTSTEP General Reference vol. 1 (1992) and NeXT Publications, NeXTSTEP General Reference vol. 2 (1992) (collectively, Reference), U.S. Pat. No. 5,649,222 (filed May 8, 1995) (Mogilevsky), pp. 39.
Appendix 12, Claim Chart "U.S. Pat. No. 5,437,036," References cited: U.S. Pat. No. 5,437,036 (filed Sep. 3, 1992),(Stamps), Larry Koved & Ben Shneiderman, Embedded Menus: Selecting Items in Context, vol. 29, No. 4., Ass'n for Computing Machining, 312 (1986) (Koved), Gerald Salton, Automatic Text Processing: The Transformation, Analysis, and Retrieval of Information by Computer (Michael A. Harrison ed., Addison-Wesley 1989) (Salton), NeXT Publications, NeXTSTEP General Reference vol. 1 & NeXT Publications, NeXTSTEP General Reference vol. 2 (1992) (collectively, Reference), U.S. Pat. No. 5,649,222 (filed May 8, 1995) (Mogilevsky), pp. 41.
Appendix 13, Claim Chart "Netscape Navigator 1.0 and 1.1," References cited: Screenshots of Netscape Navigator version 1.1, Mar. 1995 (Netscape 1.1), Gerald Salton, Automatic Text Processing: The Transformation, Analysis, and Retrieval of Information by Computer (Michael A. Harrison ed., Addison-Wesley 1989) (1989) (Salton), pp. 46.
Appendix 14, Claim Chart "The Newton system," References cited: Apple Computer, Inc., Newton Programmer's Guide for Newton 2.0, 1996 (Guide), Screenshots taken on an MessagePad 110 running Newton 1.2 operating system. I have personally confirmed that all functionality demonstrated by the screenshots exist on a MessagePad 110 running the Newton 1.2 operating system, Pensoft Corporation, Perspective Handbook (1992) (Perspective Handbook), Gerald Salton, Automatic Text Processing: The Transformation, Analysis, and Retrieval of Information Bycomputer (Michael A. Harrison ed., Addison-Wesley 1989) (Salton), pp. 54.
Appendix 15, Claim Chart "Selection Recognition Agent," References cited: Milind S. Pandit and Sameer Kalbag, The Selection Recognition Agent: Instant Access to Relevant Information and Operations, ACM 1997 (SRA), pp. 28.
Appendix 4, Claim Chart "Perspective System," Materials cited: Perspective Source Code 1992-93 (Code), Pensoft Corporation, Perspective Handbook (1992) (Handbook), Screenshots taken on an AT&T EO Personal Communicator model 440 and 880. I have personally confirmed that all functionality demonstrated by the screenshots exist on an AT&T EO Personal Communicator model 440 and 800 running either Personal Perspective or the Perspective Business Edition, Gerald Salton, Automatic Text Processing: The Transformation, Analysis, and Retrieval of Information by Computer (Michael A. Harrison ed., Addison-Wesley 1989)(Salton), pp. 88.
Appendix 5, Claim Chart "Perspective Handbook," References cited: Pensoft Corporation, Perspective Handbook (1992) ("Handbook"), Gerald Salton, Automatic Text Processing: The Transformation, Analysis, and Retrieval of Information by Computer (Michael A. Harrison ed., Addison-Wesley 1989) (Salton), pp. 43.
Appendix 6, Claim Chart "NeXTSTEP System," Materials cited: NeXT Publications, NeXTSTEP General Reference vol. 1 & NeXT Publications, NeXTSTEP General Reference vol. 2 (1992) (collectively, Reference), U.S. Pat. No. 5,437,036 (filed Sep. 3, 1992) (Stamps), U.S. Pat. No. 5,649,222 (filed May 8, 1995) (Mogilevsky), Larry Koved & Ben Shneiderman, Embedded Menus: Selecting Items in Context, vol. 29, No. 4., Ass'n for Computing Machining, 312 (1986) (Koved), Gerald Salton, Automatic Text Processing: The

(56) References Cited

OTHER PUBLICATIONS

Transformation, Analysis, and Retrieval of Information by Computer (Michael A. Harrison ed., Addison-Wesley 1989) (Salton), pp. 68.
Appendix 7, Claim Chart "NeXTSTEP General Reference vol. 1 & NeXTSTEP General Reference vol. 2," References cited: NeXT Publications, NeXTSTEP General Reference vols. 1 (1992) (Reference vol. 1), NeXT Publications, NeXTSTEP General Reference vols. 2 (1992) (Reference vol. 2), U.S. Pat. No. 5,437,036 (filed Sep. 3, 1992) (Stamps), U.S. Pat. No. 5,649,222 (filed May 8, 1995) (Mogilevsky), Larry Koved & Ben Shneiderman, Embedded Menus: Selecting Items in Context, vol. 29, No. 4., Ass'n for Computing Machining, 312 (1986) (Koved), Gerald Salton, Automatic Text Processing: The Transformation, Analysis, and Retrieval of Information by Computer (Michael A. Harrison ed., Addison-Wesley 1989) (Salton), pp. 43.
Appendix 8, Claim Chart "U.S. Pat. No. 5,859,636," References cited: U.S. Pat. No. 5,859,636 (filed Dec. 27, 1995) (Pandit), U.S. Pat. No. 5,437,036 (filed Sep. 3, 1992) (Stamps), Gerald Salton, Automatic Text Processing: The Transformation, Analysis, and Retrieval of Information by Computer (Michael A. Harrison ed., Addison-Wesley 1989), U.S. Pat. No. 5,649,222 (filed May 8, 1995) (Mogilevsky), Larry Koved & Ben Shneiderman, Embedded Menus: Selecting Items in Context, vol. 29, No. 4., Ass'n for Computing Machining, 312 (1986) ("Koved"), pp. 48.
Appendix 9, Claim Chart "European Patent Office Publication No. 0 458 563 A2," References cited: European Patent Office Publication No. 0 458 563 A2 (published Nov. 27, 1991) (Nokia), U.S. Pat. No. 5,437,036 (filed Sep. 3, 1992) (Stamps), U.S. Pat. No. 5,649,222 (filed May 8, 1995) (Mogilevsky), Larry Koved & Ben Shneiderman, Embedded Menus: Selecting Items in Context, vol. 29, No. 4., Ass'n for Computing Machining, 312 (1986) (Koved), Gerald Salton, Automatic Text Processing: The Transformation, Analysis, and Retrieval of Information by Computer (Michael A. Harrison ed., Addison-Wesley 1989) (Salton), pp. 35.
Doug Barney, "Big Blue pitches a play-by-play of its OS plan," News/Software; Technology Analysis, LexiNexis, Info World Media Group, Jul. 11, 1994, pp. 21.
Tom Quinlan, "WordPerfect shipping alpha of OpenDoc," News, LexiNexis, Info World Media Group, New York, Jul. 4, 1994, pp. 8.
Ed Scannell, C. Stedman, CW Staff, "IBM eyes new APIs: Reorganization targets object developers enterprisewide," News, LexisNexis, Computerworld, May 30, 1994, pp. 4.
Edventure Holdings, "Component Software: competition between OpenDoc and OLE 2.0: includes related articles on object infrastructures and price Waterhouse's new auditing system," LexisNexis, Gale Group Inc., vol. 94 No. 5, May 25, 1994, pl. 6, pp. 1.
Edventure Holdings, "OpenDoc: the component guild," LexisNexis, Gale Group Inc., vol. 94 No. 5, May 25, 1994, pl. 3, pp. 17.
Newsbytes, "Apple, IBM, Sci-Atlanta Seek Interactive Apps," LexisNexis, Post-Newskeek Business Information Inc, Atlanta, Georgia, May 24, 1994, pp. 1.
Kum-Yew Lai, T.W. Malone, K-C. Yu, "Object lens: a "spreadsheet" for cooperative work," ACM Transactions on Information Systems (TOIS) TOIS, vol. 6 Issue 4, Oct. 1988, ACM, New York, NY, pp. 332-353.
Samuel J. Leffler, M. Kirk, M.J. Karels, J.S. Quarterman, "The Design and Implementation of 4.3 BSD UNIX Operation System Answer Book," Addison-Wesley Publishing, 1989, pp. 471.
Don Libes, "Exploring Expert: a tcl-based toolkit for automating interactive programs," O'Reilly & Associates Inc., Jan. 1995, Sebastopol, CA, pp. 566.
Henry Lieberman, "Demonstrational Techniques for Instructible User Interface Agents," AAAI Technical Report SS-94-03, AAAI, 1994, Cambridge, MA, pp. 107-109.
Henry Lieberman, B. Nardi, D. Wright, "Training agents to recognize text by example," Agents '99 Proceedings of the third annual conference on Autonomous Agents, ACM, New York, NY, 1999, pp. 116-122.
Pattie Maes, "Agents that reduce work and information overload," Communications of the ACM, vol. 37 Issue 7, Jul. 1994, ACM, New York, NY, pp. 30-40.

Thomas W. Malone, K. Lai, C. Fry, "Experiments with Oval: A Radically Tailorable Tool for Cooperative Work," ACM Transactions on Information Systems (TOIS),vol. 13 Issue 2, Apr. 1995, ACM, New York, NY, pp. 177-205.
Hausi A. Muller, S.R. Tilley, K. Wong, "Understanding software systems using reverse engineering technology perspectives from the Rigi project," CASCON '93 Proceedings of the 1993 conference of the Centre for Advanced Studies on Collaborative research: software engineering—vol. 1,IBM Press, 1993, pp. 217-226.
Brad A. Myers, W. Buxton, "Creating highly-interactive and graphical user interfaces by demonstration," SIGGRAPH '86 Proceedings of the 13th annual conference on Computer graphics and interactive techniques, vol. 20 Issue 4, Aug. 1986, ACM, New York, NY, pp. 249-258.
Bonnie A. Nardi, V. O'Day, "Intelligent Agents: What We Learned at the Library," Libri. vol. 46 Issue 2, Jan. 1996, Cupertino, CA, pp. 59-88.
Bonnie A. Nardi, J.R. Miller, D.J. Wright, "Collaborative, programmable intelligent agents," Communications of the ACM, vol. 41 Issue 3, Mar. 1998, ACM, New York, NY, pp. 96-104.
Netscape Communication Corporation, "Netscape's DDE Implementation," Netscape Communications Corporation, Mar. 22, 1995, pp. 16.
Netscape Communication Corporation, R. Silino, "Netscape Unveils Netscape Navigator 1.1," PR Newswire, Mar. 6, 1995, Mountain View, CA, pp. 3.
Netscape Communication Corporation, "Netscape Communications Ships Release 1.0 of Netscape Navigator and Netscape Servers," Netscape News Release, Mar. 15, 1994, Mountain View, CA, pp. 2.
Christopher Bey, Apple Press, "Newton Programmer's Guide: for Newton 2.0," Addison-Wesley Publishing, Cupertino, CA, 1996, pp. 928.
Christopher Bey, B. Anders, J. Perry, J. Simonoff, "Newton Programmer's Guide," The Apple Publishing System, Cupertino, CA, 1994, pp. 893.
John Markoff, "Microsoft Comes to the Aid of a Struggling Apple," New York Times, Boston, MA, Aug. 7, 1997, pp. 2.
NeXT Computer Inc., "NeXT Technical Summaries," NeXT Computer Inc., Redwood City, CA, Dec. 1990, pp. 365.
NeXT Computer Inc., "NXBundle," NeXT Computer Inc., 1995, pp. 10.
NeXT Computer Inc., "OpenStep Specification," NeXT Computer Inc., Oct. 19, 1994, pp. 518.
Gary Miller, J. Inscore, "NeXT Development Tools," NeXT Computer Inc., Redwood City, CA, 1990, pp. 254.
NeXT Computer Inc., "NeXTSTEP programming interface summary, release 3," Addison-Wesley, 1992, pp. 467.
NeXT Computer Inc., "NeXTstep 3.3: Developer Documentation Manuals," NeXT Software Inc., 1994.
Stan Augarten, H. Casabona, C. Rose, H. Ross, L. Koponen, "The NeXT User's Reference Manual," NeXT Inc., Redwood City, CA, 1989, pp. 450.
NeXT Publications, "NeXTStep User Interface Guidelines: Release 3," Addison-Wesley, Apr. 1993, pp. 184.
Gary Miller, K. Walrath, "NeXT Operating System Software," NeXT Computer Inc., Redwood City, CA, 1990, pp. 244.
NeXT Publications, "Development Tools and Techniques: Release 3," Addison-Wesley, Nov. 1993, pp. 453.
NeXT Publications, "NeXTStep: Object-Oriented Programming and the Objective C Language: Release 3," Addison-Wesley, Nov. 1993, pp. 240.
NeXT Publications, "NeXTStep: Programming Interface Summary," Addison-Wesley, Apr. 1993, pp. 466.
NeXT Computer Inc., "3.3 Release Notes: C Compiler," NeXT Computer Inc., 1995, pp. 149.
NeXT Publications "NeXTStep: General Reference vol. 1: Release 3," Addison-Wesley, Nov. 1992, pp. 1230.
NeXT Publications "NeXTStep: General Reference vol. 2: Release 3," Addison-Wesley, Nov. 1992, pp. 1356.
NeXT Publications "NeXTStep: Operating System Software," Addison-Wesley, Sep. 1992, pp. 451.

(56) References Cited

OTHER PUBLICATIONS

Alex Duong Nghiem, "NeXTSTEP programming: concepts and applications," Prentice-Hall, Inc., Upper Saddle River, NJ, 1993, pp. 604.
Andrew J. Novobilski, "PenPoint programming: edition 1," Addison-Wesley, Reading, Ma., 1992, pp. 385.
Milind S. Pandit, S. Malbag, "The selection recognition agent: instant access to relevant information and operations," IUI '97 Proceedings of the 2nd international conference on Intelligent user interfaces, ACM, New York, NY, 1997, pp. 47-52.
Pensoft Corp., "Pensoft Corp.: Announces Perspective Built into Every EO Personal Communicator 440 and 880 Models," PR Newswire, Redwood City, CA, Nov. 4, 1992, pp. 1.
Pensoft Corp., "Pensoft Corp.: Announcement of Shipping," PR Newswire, Redwood City, CA, Jan. 11, 1993, pp. 1.
Pensoft Corp., "Pensoft Corp.: Perspective Handbook," Pensoft Corp. Redwodd City, CA, Nov. 1992, pp. 278.
Tom Quinlan, "OpenDoc will lack networking support: WordPerfect, Apple forego DSOM initially," LexisNexis, Info World Media Group, Aug. 15, 1994, pp. 1-2.
Daniel E. Rose, C. Stevens, "V-Twin: A Lightweight Engine for Interactive Use," Apple Research Laboratories, Apple Computer, Inc., Cupertino, CA, 1996, pp. 12.
Gerard Salton, "Automatic text processing: the transformation, analysis, and retrieval of information by computer," Addison-Wesley Longman Publishing Co., Inc., Boston, MA, 1989, pp. 248-266.
Gerard Salton, C. Buckley, "Automatic text structuring and retrieval-experiments in automatic encyclopedia searching," SIGIR '91 Proceedings of the 14th annual international ACM SIGIR conference on Research and development in information retrieval, ACM, New York, NY, 1991, pp. 21-30.
Jeffrey C. Schlimmer, L.A. Hermens, "Software agents: completing patterns and constructing user interfaces," Journal of Artificial Intelligence Research, vol. 1 Issue 1, Aug. 1993, pp. 61-89.
Michael A. Schoonover, J.S. Bowie, W.R. Arnold, "GNU Emacs: UNIX Text Editing and Programing," Addison-Wesley, Reading, MA, Jan. 1996, pp. 609.
Stephanie Seneff, "A relaxation method for understanding spontaneous speech utterances," HLT '91 Proceedings of the workshop on Speech and Natural Language, Association for Computational Linguistics Stroudsburg, PA, 1992, pp. 299-304.
Michael B. Shebanek, "The Complete Guide to the Nextstep User Environment," Springer Verlag, Aug. 1, 1993, New York, NY, Telos the Electronic Library of Science, Santa Clara, CA, pp. 466.
Walter R. Smith, "Using a Prototype-based Language for User Interface: The Newton Project's Experience," OOPSLA '95 Proceedings of the tenth annual conference on Object-oriented programming systems, languages, and applications, ACM, New York, NY, 1995, pp. 61-72, ACM SIGPLAN Notices, vol. 30 Issue 10, Oct. 17, 1995, pp. 61-72.
Walter R. Smith, "The Newton Application Architecture," Proc. of the 39th IEEE Computer Society Int. Conference, pp. 156-161, San Francisco, 1994.
Bruce F. Webster, "The NeXT Book," Addison-Wesley, Reading, MA, 1989, pp. 387.
Eve Wilson, "Links and structures in hypertext databases for law," Hypertext: concepts, systems and applications, Cambridge University Press, New York, NY, 1992, pp. 194-211.
Eric A. Bier, "Embedded Buttons: Documents as user interfaces," UIST '91 Proceedings of the 4th annual ACM symposium on User interface software and technology, ACM, New York, NY, 1991, pp. 45-53.
Scott C. Deerwester, K. Waclena, M. Lamar, "A textual object management system," SIGIR '92 Proceedings of the 15th annual international ACM SIGIR conference on Research and development in information retrieval, ACM, New York, NY, 1992, pp. 126-139.
Chris Schmandt, "Phoneshell: the telephone as computer terminal," Multimedia '93 Proceedings of the first ACM international conference on Multimedia, ACM, New York, NY, 1993, pp. 373-382.
Larry Koved, B. Shneiderman, "Embedded menus: selecting items in context," Magazine Communications of the ACM, vol. 29, Issue 4, Apr. 1986, ACM, New York, NY, pp. 312-318.
A. Williams Salahshour, "Preferred Media Communication Establishment Mechanism," IBM Technical Disclosure Bulletin, Mar. 1994, Dallas, pp. 169-170.
J.M. Dunn, E.H. Stern, "Touch-Screen/Graphics Receive Message Application," IBM Technical Disclosure Bulletin, vol. 37, No. 04A, Apr. 1994, pp. 451-454.
Phil Hayes, "NameFinder: Software That Finds Names in Text," Proceedings RIAO 94, vol. 1, Issue 11-13. October, New York, pp. 762-774.
Kenneth W. Church, L. Rau, "Natural Language Processing," Magazine Communications of the ACM, vol. 38, Issue 11, Nov. 1995, ACM New York, NY, pp. 71-79.
Bruce Krulwich, C. Burkey, "Intelligent Talk-And-Touch Interfaces Using Multi-Modal Semantic Grammars," Proceedings, Fourth Bar Ilan Symposium on Foundations of Artificial Intelligence, AAAI, 1995, pp. 103-112.
Kevin Knabe, "Apple guide: a case study in user-aided design of online help," Proceeding CHI '95 Conference companion on Human factors in computing systems, ACM New York, NY, 1995, pp. 286-287.
Hui Wang, D. Bell, J. Hughs, P. Ojha, "Neutral Network Approach to Relevance," Neural Networks, 1995. Proceedings, IEEE International Conference, vol. 4, Perth, WA, Australia, pp. 1961-1965.
Apple Computer Inc. "Newton Apple MessagePad Handbook," Apple Inc., Cupertino, CA,1995, pp. 1-358.
John Stone, K. Newby, L. Dorsey, P. Ivanier, "The Newton Solutions Guide: Software, Peripherals and Accessories for Newton PDAs," Published by JointSolutions Marketing, 1995, pp. 1-64.
Keith Bostic, "V1.90: 4.3BSD-Reno/ Fourth Berkeley Software Distribution," Com.Archives, Jul. 6, 1990, pp. 1-11.
Maristella Agosti, M. Melucci, F. Crestani, "Automatic authoring and construction of hypermedia for information retrieval," Journal: Multimedia Systems—Special issue on content-based retrieval archive, vol. 3 Issue 1, Feb. 1995, Springer-Verlag New York, Inc., Secaucus, NJ, pp. 15-24.
Alfred V. Aho, M. J. Corasick, "Efficient string matching: an aid to bibliographic search," Magazine Communications of the ACM, vol. 18 Issue 6, Jun. 1975, ACM New York, NY, pp. 333-340.
Apple Computer, Inc., "Newton Programmer's Reference for Newton 2.0," Apple Inc., Cupertino, CA, Addison-Wesley Publishing, Cupertino, CA, 1996, pp. 1376.
Christopher Barr, M. Neubarth, "Pen Pals," PC Magazine, vol. 2, No. 17, Oct. 12, 1993, pp. cover page, table of contents and 117-182.
Deborah Barreau, B.A. Nardi, "Finding and reminding: file organization from the desktop," Newsletter ACM SIGCHI, Bulletin, vol. 27 Issue 3, Jul. 1995, ACM, New York, NY, pp. 39-43.
David Benyon, D. Murray, "Developing adaptive systems to fit individual aptitudes," IUI '93 Proceedings of the 1st international conference on Intelligent user interfaces, ACM, New York, NY, 1993, pp. 115-121.
Eric A. Bier, M.C. Stone, K. Fishkin, W. Buxton, T. Baudel, "A taxonomy of see-through tools," CHI '94 Conference companion on Human factors in computing systems, ACM, New York, NY, 1994, pp. 358-364.
Thomas Bonura, J. R. Miller, "Drop Zones: An extension to LiveDoc," Newsletter, ACM SIGCHI Bulletin, vol. 30 Issue 2, Apr. 1998, ACM, New York, NY, pp. 59-63.
Jim Miller, T. Bonura, "From documents to objects: an overview of LiveDoc," Newsletter, ACM, vol. 30 Issue 2, Apr. 1998, ACM, New York, NY, pp. 53-58.
Jeanette Borzo, T. Quinlan, "Word Perfect and Novell Plan to adopt OpenDoc: Apple's compound-document architecture," PC Expo 1993, Info World, vol. 15 issue 27, Jul. 5, 1993, pp. 8.
Helen Casbona, K. Vian, R. West, "User's Guide," NextStep, Jan. 1, 1993, pp. 384.
Daniel T. Chang, "HieNet: a user-centered approach for automatic link generation," Hypertext '93 Proceedings of the fifth ACM conference on Hypertext, ACM, New York, NY, 1993, pp. 145-158.
Doug Clapp, "The Next Bible: Hardware and Software Systems for the Next Computer," Brady Books, NY, 1990, pp. 683.

(56) References Cited

OTHER PUBLICATIONS

Philip R. Cohen, A. Cheyer, M. Wang, S.C. Baeg, "An open agent architecture," Readings in agents, Morgan Kaufmann Publishers Inc., San Francisco, CA, 1998, pp. 197-204.
Allen Cypher, "Watch What I Do: Programming by Demonstration," The MIT Press,Cambridge, Massachusetts London, England, 1993, pp. 652.
Allen Cypher, "Eager: programming repetitive tasks by example," CHI '91 Proceedings of the SIGCHI conference on Human factors in computing systems: Reaching through technology, ACM, New York, NY, 1991, pp. 33-39.
Anind K. Dey, G.D. Abowd, A. Wood, "CyberDesk: a framework for providing self-integrating context-aware services," IUI '98 Proceedings of the 3rd international conference on Intelligent user interfaces, ACM, New York, NY, 1998, pp. 47-54.
Eric Ding, "GNU Emacs," Free Software Foundation Inc., Aug. 15, 1995, Boston, MA, pp. 5.
Ivor Durham, D.A. Lamb, J.B. Saxe, "Spelling correction in user interfaces," Magazine, Communications of the ACM, vol. 26 Issue 10, Oct. 1983, ACM, New York, NY, pp. 709-710.
Jay Earley, "An efficient context-free parsing algorithm," Magazine, Communications of the ACM—Special 25th Anniversary Issue, vol. 26 Issue 1, Jan. 1983, ACM, New York, NY, pp. 3.
Go Cororation, "PenPoint: Architectural Reference vol. II," Addison-Wesley Publishing Company, Jun. 1992, Foster City, CA, pp. 528.
Go Cororation, "PenPoint: Architectural Reference vol. I," Addison-Wesley Publishing Company, Apr. 1992, Foster City, CA, pp. 645.
R.E. Griswold, J.F. Poage, I.P. Polonsky, "The Snobol4 Programing Language: Second Edition," Prentice Hall Inc., Englewood Cliffs, NJ, May 1970, pp. 256.
Kevin Hughes, "Entering the World-Wide Web: A guide to cyberspace," ACM SIGLINK Newsletter, vol. III, No. I, Mar. 1994, pp. 4-8.
Eric Jackson, D. Appelt, J. Bear, R. Moor, A. Podlozny, "A template matcher for robust NL interpretation," HLT '91 Proceedings of the workshop on Speech and Natural Language, Association for Computational Linguistics Stroudsburg, PA, 1991, pp. 190-194.
Kaare Christian, S. Richter, "The Unix Operating System: Third Edition," John Wiley & Sons Inc., New York, NY, 1994, pp. 541.
Christopher Kennedy, B. Boguraev, "Anaphora in a Wider Context: Tracking Discourse Referents," ECAI 96, 12th European Conference on Artificial Intelligence, John Wiley & Sons, 1996, pp. 582-586.
Erica Kerwien, "Lotus Notes Application Development Handbook," IDG Book Worldwide Inc., Foster City, CA, Dec. 1994, pp. 506.
David Kurlander, S. Feiner, "Interactive constraint-based search and replace," CHI '92 Proceedings of the SIGCHI conference on Human factors in computing systems, ACM, New York, NY, 1992, pp. 609-618.
David Kurlander, E.A. Bier, "Graphical Search and Replace," Computer Graphics, vol. 22 Issue 4, Aug. 1988, Proceedings of SIGGRAPH '88, Atlanta, Georgia, pp. 113-120.
Exhibit 647-7, Claim Chart "European Patent Office Publication No. 0 458 563 A2," References cited: European Patent Office Publication No. 0 458 563 A2 to Nokia Mobile Phones Ltd (published Nov. 27, 1991) (NokiaEP563), U.S. Pat. No. 5,437,036 to Microsoft Corporation (filed Sep. 3, 1992) (Stamps), U.S. Pat. No. 5,649,222 to Microsoft Corporation (filed May 8, 1995) (Mogilevsky), Koved and Ben Shneiderman, Embedded Menus: Selecting Items in Context (Communications of the ACM, vol. 29 No. 4 Apr. 1986) (Koved), pp. 20. circa 2008.
Apple Computer, Inc. "Apple Data Detectors 1.0.2. Read Me" (1998), 2 pgs.
Simmons, Mark. "MacAddicts at MacWorld," MacWorld Expo, Boston (Aug. 1996), 5 pgs.
Claris Corporation. "Claris Em@iler: Getting Started," Claris for Macintosh (1996), 62 pages.
Miller, Matthew. "Apple Data Detector Depot: ADD Depot," http://web.archive.org/web/20000819081818/http://homepage.mac.com/matthewmiller/add/ (2000), 4 pgs.
Abowd, Gregory D. et al. Applying Dynamic Integration as a Software Infrastructure for Context-Aware Computing (1998), 10 pgs.
Qualcomm, Inc. Eudora ProTM for Newton®, Version 1.0 for Newton 2.0 and 2.1 (Oct. 1996), cover pages, Table of Contents and pp. 1-22 (28 pages total).
Apple Computer, Inc. "Newton: Apple MessagePad Handbook", Copyright © 1995, cover pages, Table of Contents and pp. 1-358 (196 pages total).
Apple Computer, Inc. "Newton Solutions Guide: Software, Peripherals and Accessories for Newton PDAs", Copyright © 1995, Joint Solutions Marketing, 64 pgs.
Schmandt, Chris. Phoneshell: the Telephone as Computer Terminal (1993), 10 pgs.
Apple Computer, Inc. "Contextual Menu Manager/Apple Data Detectors" (1998), 6 pgs.
Dey, Anind K. et al. "CyberDesk: A Framework for Providing Self-Integrating Ubiquitous Software Services" (1997), 10 pgs.
Dey, Anind D. et al. "CyberDesk: The Use of Perception in Context-Aware Computing", Future Computing Environments: PUI Workshop Submission (1997), 5 pgs.
Anonymous and untitled article: http://web.archive.org/web/19980215054229/www.macos8.com/macos8.shtml (1998), 3 pgs.
Apple Internet Address Detectors User's Manual, Aug. 28, 1997, pp. 1-15.
MacWeek Report, Aug. 8, 1996, 2 pgs.
EMailman(sm) Internet Address Detectors, http://www.emailman.com/mac/iad.html, Jan. 12, 2004, 3 pgs.
Apple Data Detectors, Dec. 30, 1996, 7 pgs.
Welcome to Apple Data Detectors, Apple Data Detectors, Mar. 4, 1997, 19 pgs.
Welcome to Apple Data Detectors, Apple Data Detectors, Apr. 8, 1997, 11 pgs.
James Staten, Special Report Apple Looks to the Future, James Staten, Ziff-Davis Publishing, Aug. 7, 1996, 2 pgs.
Mike Langberg, Show of Potential Apple Breaks New Ground by Displaying What's on Its Drawing Board "Innovation is at the Heart of What We Do", Aug. 7, 1996, San Jose Mercury News, 2 pgs.
Apple Introduces Internet Address Detectors, Technology Makes It Easier to Manage and Perform Actions with Internet Addresses; Extends Innovative Capabilities Delivered with Mac OS 8, http://www.apple.com/pr/library/1997/q4/970908.pr.rel.internet.html,Sep. 8, 1997, 3 pgs.
The AppleScript Sourcebook—AppleScript Editors, AppleScript Editors, Utilities & Environments, Tools for creating and using AppleScript scripts, including editors, application generators, utilities, and command-line, menu and button bar execution environments, webmaster@applescriptsourcebook.com, http://www.AppleScriptSourcebook.com/links/applescripteditors.html, Oct. 13, 2002, 6 pgs.
Thomas Bonura and James R. Miller ,Drop Zones, An Extension to LiveDoc, http://www.acm.org/sigchi/bulletin/1998.2/bonura.html ,SIG CHI, vol. 30, No. 2, Apr. 1998, 9 pgs.
Thomas Bonura and James R. Miller ,From Documents to Objects, An Overview of LiveDoc, SIGCHI Bulletin vol. 30 No. 2, Apr. 1998: From Documents to Objects, SIG CHI, vol. 30, No. 2, Apr. 1998, 11 pgs.
Bonnie A. Nardi, James R Miller, and David J. Wright, Collaborative,Programmable Intelligent Agents, Mar. 1998/vol. 41, No. 3 Communications of the ACM, pp. 96-104.
A Farewell to the Apple Advanced Technology Group, http://www.acm.org/sigchi/bulletin/1998.2/, SIG CHI, vol. 30, No. 2, Apr. 1998, 3 pgs.
Apple Internet Address Detectors User's Manual, Aug. 28, 1997, 16 pgs.
What are Apple Data Detectors?, JRM (ver 4.0),Copyright © 1997 Apple Computer, Inc., 5 pgs.
The Apple Data Detectors FAQ, JRM (v. 4.0), Copyright © 1997 Apple Computer, Inc., 3 pgs.
Milind S. Pandit and Sameer Kalbag,The Selection Recognition Agent: Instant Access to Relevant Information and Operations, IUI 97, Orlando Florida USA, © 1997 ACM 0-89791-839-8/96/01, pp. 47-52.

(56) References Cited

OTHER PUBLICATIONS

Gregory D. Abowd, Anind K. Dey, Robert Orr & Jason Brotherton, Context-Awareness in Wearable and Ubiquitous Computing, Proceedings of the First International Symposium on Wearable Computers (ISWC '97) 0-8186-8192-6/97 © 1997 IEEE, 3 pgs.
Andrew Wood, Anind Dey, Gregory D. Abowd, CyberDesk: Automated Integration of Desktop and Network Services, CHI 97. Atlanta GA USA,Copyright 1997 ACM 0-g9791-802-9/97/03, 2 pgs.
James R. Miller and Thomas Bonura ,From Documents to Objects an Overview of LiveDoc, SIGCHI Bulletin vol. 30, No. 2 Apr. 1998 , pp. 3-58.
James R. Miller and Thomas Bonura ,Drop Zones an Extension, SIGCHI Bullelin vol. 30, No. 2 Apr. 1998, pp. 59-63.
Hui Wang, David Bell, John Hughs, Piyush Ojha, Neural network approach to relevance, IEEE, 1995, pp. 1961-1965.
Cara Cunningham, Apple kicks off Macworld with talk of revival, new software demos, InfoWorld Electric, Jan. 11, 2004, 2 pgs.
Writing new detectors for Apple Data Detectors, Copyright © 1997, Apple Computer, Inc., 8 pgs.
Welcome tq.AppleWeb, 1997, 4 pgs.
Apple Data Detectors, Apple Inc., 1997, 4 pgs.
Apple Introduces Internet Address Detectors, http://www.apple.com/pr/library/1997/q4/97090S.pr.rel.internet.html ,1997, 44 pgs.
Developer's Guide to Apple Data Detectors, for version 1.0.2, Apple Computer, Inc., Dec. 1, 1997, 34 pgs.
Apple Data Detectors User's Manual, Copyright © 1997 Apple Computer, Inc., 16 pgs.
Communications of the ACM, Mar. 1998—vol. 41, No. 3, 12 pgs.
First International Symposium on Wearable Computers, IEEE, Oct. 13-14, 1997, 8 pgs.
CHI 97 Human Factors in Computing Systems, Mar. 22-27, 1997, 9 pgs.
Proceedings of the ACM Symposium on User Interface Software and Technology, UIST 97, 10th Annual Symposium on User Interface Software and Technology,Oct. 14-17, 1997, 9 pgs.
Milind S. Pandit, Sameer Kalbag, The Selection Recognition Agent: Instant Access to Relevant Information and Operations, Copyright © 1997 ACM 0-89791-839-8/96/01.
Michael David Pinkerton, Ubiquitous Computing: Extending Access to Mobile Data, Georgia Institute of Technology, May 1997, 98 pgs.
1997 International Conference on Intelligent User Interfaces,IUI97 Conference Proceedings, ACM, Jan. 6-9, 1997, 14 pgs.
Proceedings of the Third Annual Conference on Autonomous Agents, ACM, May 1-5, 1999.
Dunn, JM and Stern, EH,Touch-Screen/Graphics Receive Message Application, IBM TDB, IPCOM000111975D Apr. 1, 1994,TDB v37 n4A 04-94 p. 451-454, Mar. 26, 2005, 5 pgs.
Chris O'Malley,Simonizing the PDA, BellSouth's communicative Simon is a milestone in the evolution of the PDA, http://web.archive.org/web/19990221174856/byte.com/a rt/9412/sec11/art3.htm, Dec. 1994, 7 pgs.
Salahshour, A and Williams, ML, Preferred Media Communication Establishment Mechanism, IBM Technical Disclosure Bulletin, vol. 37 No. 03 Mar. 1994, 3 pgs.
Gregory D. Abowd, Anind K. Dey, and Andrew Wood, Future Computing Environments, Applying Dynamic Integration as a Software Infrastructure for Context-Aware Computing, Cyberdesk, 1998, 17 pgs.
Gregory D. Abowd, Anind K. Dey, Gregory Abowd, Robert Orr & Jason Brotherton, Future Computing Environments , Context-Awareness in Wearable and Ubiquitous Computing, 1997, 15 pgs.
Anind K. Dey, Future Computing Environments, Context-Aware Computing: The CyberDesk Project, Mar. 23-25, 1998, 9 pgs.
Anind K. Dey , Gregory D. Abowd, Mike Pinkerton, and Andrew Wood, Future Computing Environments, CyberDesk: A Framework for Providing Self-Integrating Ubiquitous Software, 1997, 18 pgs.
Apple Introduces Internet Address Detectors, Technology Makes it Easier to Manage and Perform Actions with Internet Addresses; Extends Innovative Internet CapabiUties Delivered with Mac OS 8, Sep. 8, 1997, 44 pgs.
U.S. Appl. No. 11/710,182, filed Feb. 23, 2007, titled "Pattern Search Methods and Apparatuses," by inventors Olivier Bonnet, et al., 28 pages (specification and drawings).
Eudora Mail Pro, "Windows Version 3.0 User Manual", Sep. 1996, pp. 3 total.
Eudora Mail Pro, "Version 3.0 for Windows User Manual", Jun. 1997, pp. 198 total.
Eudora Mail Light, "Version 3.1 for Macintosh User Manual", Apr. 1997, pp. 190 total.
International Preliminary Report on Patentability and Written Opinion for International PCT No. PCT/US2008/002263, mailed on Sep. 3, 2009, pp. 8 total.
Lin et al., "Postal Address Detection from Web Documents", IEEE Computer Society, copyright 2005, pp. 6 total.
Lerman, Kristina et al., "Automatically Labeling the Inputs and Outputs of Web Services", Proceedings of the National Conference on Artificial Intelligence (AAAI-2006), Menlo Park, CA, 2006, 6 pages.
Lerman, Kristina et al., "Populating the Semantic Web", Proceedings of the AAAI 2004 Workshop on Advances in Text Extraction and Mining, 2004, 6 pages.
Lerman, Kristina et al., "Wrapper Maintenance: A Machine Learning Approach", Journal of Artificial Intelligence Research, 18 (2003), pp. 149-181.
PCT International Search Report and Written Opinion for PCT International Appln. No. US2008/002263, mailed Aug. 4, 2008 (12 pages).
Appelt et al. "FASTUS: A finite-state processor for information extraction from real-world text" 1993.
Hierons, "Testing from a nondeterministic finite state machine using adaptive state counting" 2004.
Mohri, "Generic ϵ-removal algorithm for weighted automata" 2001.
Delmon, "Generic epsilon-removal" Jun. 2007.
Kempe et al., "Extraction and recording of input-e-cycles in finite state transducers" 2004.
Kallmeyer, "Computational Linguistics II: ParsingBottom-Up Parsing" Dec. 5, 2007.
Otto, "Epsilon_Logic is More Expressive than First Order Logic over Finite Structures" 1999.
"Class 20: Shift-Reduce Parsing (1)" 2004.
Aho et al. "LR Parsing" 1974.
Agrawal et al. "An Efficient Incremental LR Parser for Grammars With Epsilon Productions" 1983.
Graehl et al. "Training Tree Transducers" 2004.
Mohri, "Finite-state transducers in language and speech processing" 1997.
Piskorski et al. "An intelligent text extraction and navigation system" 2000.
Teitelbaum et al. "Introduction to Compilers" Jan. 26, 2007.
Cse321, Programming Languages and Compilers, "Lecture #5" Jan. 23, 2006.
Kempe, "Reduction of Intermediate alphabets in finite-state transducer cascades" 2000.
Johnston et al. "Finite-state multimodal parsing and understanding" 2000.
Mohri, "Weighted Finite-State Transducer Algorithms. An Overview" 2004.
Kempe, "Factorization of ambiguous finite-state transducers" 2001.
Hsu et al. "Generating finite-state transducers for semi-structured data extraction from the Web" 1998.

* cited by examiner

| S | Reduction 0 -> a |
| 1 | Reduction 1 -> a |
| 2 | Reduction 0 -> b |
| 4 | Reduction 3 -> E |
| 5 | Reduction 1 -> b |

| 1 | Reduction 2 -> E |
| 4 | Reduction 3 -> E |
| 5 | Reduction 1 -> A |
| 6 | Reduction 2 -> E |

DATA DETECTION

RELATED APPLICATION

This application is a continuation of co-pending U.S. application Ser. No. 12/240,671 filed on Sep. 29, 2008, which claims the benefit of U.S. Provisional Patent Application No. 61/059,722, filed on Jun. 6, 2008, which is herein incorporated by reference.

FIELD OF THE INVENTION

The present invention relates to the field of processing sequences of characters and, in addition, to detecting data included in such sequences of characters.

BACKGROUND OF THE INVENTION

The processing of sequences of characters to analyze their grammatical structure is well-known, both for analyzing natural languages and computer languages. In the case of natural languages, the sequences of characters are broken down into words, each word forming a part of speech, such as noun, verb, adjective, adverb, preposition and no on. Thus, each word can be allocated a class according to its function in context.

For the processing of computer languages, it is well known to process the sequence of characters in a lexer to break the characters into a sequence of tokens and then to parse the tokens to create some form of internal representation, which can then be used in a compiler or an interpreter.

Such processing has previously been used to analyze sequences of characters to extract useful information from the sequence. For example, techniques have been developed to analyze blocks of text, such as e-mails or other data received by or input to a computer, to extract information such as e-mail addresses, telephone and fax numbers, physical addresses, IP addresses, days, dates, times, names, places and so forth. In one implementation, a so-called data detector routinely analyses incoming e-mails to detect such information. The detected information can then be extracted to update the user's address book or other records.

Conventionally, such data detection is performed using a layered engine as shown in FIG. 1. The engine is embodied in a processor 1 and comprises a lexical analyzer or lexer 10 and a parser 20. The lexer 10 receives as its input a sequence of characters, such as the characters in an e-mail message. Note that the characters are not limited to letters or even numbers, but may include any other characters, such as punctuation.

The lexer 10 stores a vocabulary that allows it to resolve the sequence of characters into a sequence of tokens. Each token comprises a lexeme (analogous to a word) and a token type (which describes its class or function). One token type is provided for each predetermined function. As an example, a simple lexer 10 may include the following vocabulary:
DIGIT:=[0-9] (A digit is a single number from 0 to 9)
NUMBER:=DIGIT+(A number is two or more digits together)
LETTER:=[a-zA-Z] (A letter is an upper or lower case letter from A-Z)
WORD:=LETTER+(A word is two or more letters together)

The lexer 10 would break down the string of characters "There are 2 books and 15 magazines" into the following tokens:

| Lexeme | Token Type |
|---|---|
| THERE | WORD |
| ARE | WORD |
| 2 | DIGIT |
| BOOKS | WORD |
| AND | WORD |
| 15 | NUMBER |
| MAGAZINES | WORD |

The parser 20 receives the sequence of tokens from the lexer 10. The parser 20 includes a grammar, which it uses to analyze the tokens to extract predetermined data. For example, if the engine 1 is intended to detect all quantities, the parser 20's grammar may be that:
QUANTITY:=DIGIT WORD|NUMBER WORD
where "|" indicates "or". Thus, on receiving the sequence of tokens from the lexer 10, the parser 20 will return the quantities "2 books" and "15 magazines".

Commonly, both the lexer 10 and the parser 20 use a decision tree. An example of such a decision tree for a further example of a lexer 10 is shown in FIG. 2. In this case, the lexer 10 includes the following vocabulary:
a:=1 9 [0-9]{2}
b:=1 9 5
where 'a' and 'b' are two token types that the lexer 10 can ascribe to different lexemes. The decision tree in FIG. 2 shows 5 possible states in addition to the start state. As the lexer 10 processes a sequence of characters, it checks the first character in the sequence against the options available at the start state S and proceeds according to the result.

For example, if the lexer 10 is presented with the sequence of characters '1984', it will process the character '1' first. State S only allows the processing to proceed if the first character is '1'. This condition is met so character '1' is consumed and processing proceeds to state 1, where the next character in the sequence ('9') is compared with the available conditions. It should be noted that state 1 is represented using a dotted circle. This is indicative that processing may not end at this state without the branch dying, as will become apparent later.

The only available condition at state 1 is that the next character is '9'. This condition is met, so character '9' is consumed and processing proceeds to state 2.

The conditions at state 2 are that processing should proceed to state 3 if the next character is '5', or that it should proceed to state 4 if the next character is any one of 0, 1, 2, 3, 4, 6, 7, 8 or 9. Again, state 2 is represented using a dotted circle and processing may not end at this state.

The next character is '8', which meets the condition for processing to proceed to state 4, which is also represented by a dotted circle. Accordingly, the '8' is consumed and processing continues. Since the next character in the sequence ('4') meets the only available condition from state 4, processing proceeds to state 5.

State 5 is represented by a solid circle, indicating that processing may end there. As shown in FIG. 2, state 5 has the property of reducing the consumed characters to a token of token type 'a'. In our example, since all the characters have been used up and there are no more characters, processing ends at state 5 and the consumed sequence of characters is reduced to a token comprising the lexeme '1984' and the token type 'a'.

Similarly, the lexer 10 in FIG. 2 would process the sequence of characters '195' as set out below. First, characters '1' and '9' would be consumed in the same manner as described above. However, at state 2, the next character is '5'.

This meets the condition for proceeding to state 3, which has the property of reducing the consumed characters to a token of token type 'b'. In this case, since all the characters have been used up and there are no more characters, processing ends at state 3 and the consumed sequence of characters is reduced to a token comprising the lexeme '1985' and the token type 'b'.

By contrast, the lexer 10 in FIG. 2 would process the sequence of characters '1955' as set out below. First, characters '1', '9' and '5' would be consumed in the same manner as described above. However, at state 3, not all the characters have been used up. Rather, a further '5' remains, which meets the condition for proceeding to state 5, where the consumed sequence of characters is reduced to a token comprising the lexeme '1955' and the token type 'a'.

Now consider a parser 20 including the following grammar:

A:=a|ε
E:=Acd|ce where A and E are predetermined grammatical or data categories that we wish to detect; a, c, d and e are various token types; and ε represents a "nothing". Thus, the parser 20 outputs a category A if either a lexeme with token type 'a' is presented or an unmatched token type is presented. Similarly, the parser 20 outputs an E when it processes Acd or cc. However, since the parser 20 outputs an A when presented with a token type 'a' or with a nothing, by substituting the equation for A into the equation for F, it can be seen that in practice the parser 20 outputs an E when it processes any of acd, cd and ce.

A decision tree for this grammar is shown in FIG. 3 and includes start state S, finish state F, and processing states 0-5. As the parser 20 processes a sequence of tokens, it checks the first token in the sequence against the options available at the start state S and proceeds according to the result.

For example, if the parser 20 is presented with the sequence of tokens comprising a token having token type c, followed by a token having token type e, the parser 20 must process the token-type sequence 'ce'. The following table represents the processing that takes place.

| Current state | Sequence to process | Previous states |
|---|---|---|
| S | ce | |
| 0 | e | S |
| 1 | | S, 0 |
| S | E | |
| F | | S |

Put simply, proceeding from the start state S, the parser 20 consumes a 'c' and proceeds to state 0, and then consumes an 'e' and proceeds to state 1. State 1 allows processing to finish with the reduction to go back two states and replace the consumed letters by an 'E'. Processing then returns to the start state S, where the E is processed. The E is consumed as processing proceeds to the finish state F. Thus, the token type sequence c followed by e is parsed as having the grammatical or data type E.

Similarly, the token sequence 'acd' is processed using the parsing tree shown in FIG. 3 as shown in the following table:

| Current state | Sequence to process | Previous states |
|---|---|---|
| S | acd | |
| 5 | cd | S |
| S | Acd | |
| 2 | cd | S |
| 3 | d | S, 2 |
| 4 | | S, 2, 3 |
| S | E | |
| F | | S |

Here, the first token type to be parsed is 'a'. Starting at start state S, the 'a' is consumed and processing proceeds to state 5, which has the reduction to go back one state and replace the consumed items with an 'A'. Thus, the sequence is changed from 'acd' to 'Acd' and processing returns to state S, where the A is consumed and processing proceeds to state 2. Next, as processing proceeds along the middle branch of the tree to states 3 and 4, the c and the d are consumed. At state 4, the consumed sequence Acd is replaced by an E and processing returns to state S, where the E is processed. The E is consumed as processing proceeds to the finish state F. Thus, the token type sequence a followed by c followed by d is also parsed as having the grammatical or data type E.

Similarly, the token sequence 'cd' is processed using the parsing tree shown in FIG. 3 as shown in the following table:

| Current state | Sequence to process | Previous states |
|---|---|---|
| S | cd | |
| S | Acd | |
| 2 | cd | S |
| 3 | d | S, 2 |
| 4 | | S, 2, 3 |
| S | E | |
| F | | S |

Here, the first token type to be parsed is 'c'. Starting at start state S, the 'c' is consumed and processing proceeds to state 0. The next token type to be parsed is a 'd', but state 0 does not provide an option for proceeding with this token type. Moreover, state 0 is represented by a dotted circle, indicating that processing cannot finish at that state. Accordingly, this branch is a "dead" branch and processing reverts with the entire sequence intact to the start state S. This state is provided with the reduction that an 'A' must be placed at the front of the sequence. Thus, the sequence to be parsed is now 'Acd'. This is the same sequence as is generated during processing of the sequence acd above, and processing proceeds in exactly the same way. Thus, the token sequence c followed by d is also parsed as having the grammatical or data type E.

In particular, the example illustrates how the epsilon symbol is handled. Specifically, an additional path is provided, the additional path comprising a link between the start state S and state 5. This path is taken when the first token is an 'a', which is consequently consumed and replaced with an 'A'.

Importantly, the when all of the conditions of the start S lead to a dead branch, the reduction associated with the start state S is performed. This reduction involves producing a new token (in this case an 'A') and adding it to the front of the sequence of tokens without first consuming a token. Put another way, in this reduction the sequence of tokens is revised by adding a token to the beginning and then comparing the revised sequence with the conditions of the same state. This type of reduction is known as an epsilon reduction.

In this way, it can be seen that the parsing tree shown in FIG. 3 is consistent with the grammar:

A:=a|ε
E:=Acd|ce

The foregoing is a simple explanation of the basic functionality of lexers 10 and parsers 20. This functionality can be adapted to detect predetermined types of data from a sequence of characters, for example in an e-mail or a block of text. Imagine that it is intended to detect either a time or a bug identification code in a block of text. In the following example, the format of a time to be detected is that it is always one of AM, PM, A or P followed by two digits, whereas the format of a bug identification code to be detected is always two letters followed by three digits. Accordingly, the lexer 10 may be provided with the vocabulary:

INITIALS:=[A-Z]{2} (INITIALS is any two letters together)
MERIDIAN:=(A|P)M? (MERIDIAN is the letter A or the letter P, optionally followed by the letter M)
DIGIT:=[0-9] (DIGIT is any character from 0 to 9)

whereas the parser 20 may be provided with the grammar:
BUG_ID:=INITIALS DIGIT{3} (INITIALS token followed by 3 DIGIT tokens)
TIME:=MERIDIAN DIGIT {2} (MERIDIAN token followed by 2 DIGIT tokens)

In more detail, the lexer 10 will output a sequence of a letter from A to Z followed by another letter from A to Z as a token having a lexeme of the two letters and having the token type INTIALS. It will also output the letters AM and PM as a token having the token type MERIDIAN. In this notation '?' indicates that the preceding character(s) may or may not be present. Thus, the lexer 10 will also output the letter A alone, or the letter P alone as a token having the token type MERIDIAN.

FIG. 4 shows a decision tree of the lexer 10 and FIG. 5 shows a decision tree of the parser 20. As will be clear from following the decision tree shown in FIG. 4, the lexer 10 will process the sequence of characters AM02 and output four tokens. The first is a token having the lexeme AM and the token type INITIALS, while the second is a token also having the lexeme AM, but this time the token typeMERIDIAN. This is consistent with the vocabulary used by the lexer 10, since the letters AM can be either INITIALS or a MERIDIAN. The third and fourth tokens have the lexemes '0' and '2' respectively and each has the token type DIGIT. This sequence of three tokens is then operated on by the parser 20.

As noted above, the two tokens both have the lexeme AM and the respective token types INITIALS and MERIDIAN. Accordingly, when the character string AM occurs, two sequences of tokens are processed by the parser 20 using the decision tree shown in FIG. 5. One sequence of tokens meets the first condition of the starting state, while the other sequence of tokens meets the other condition. Accordingly both conditions or branches are investigated, either in turn or in parallel.

In the case of the left-hand INITIALS branch, the processing proceeds to state 1 and then states 2 and 3, since the next two tokens have the token type DIGIT. However, the parser 20 then runs out of tokens to parse and so cannot proceed to state 4. Since state 3 is represented by a dotted circle, processing cannot end there and so a BUG_ID is not detected.

In the case of the right-hand MERIDIAN branch, the processing proceeds to state 5 and then states 6 and 7, since the next two tokens have the token type DIGIT. At state 7 it is determined that the sequence of tokens MERIDIAN followed by DIGIT and DIGIT represents TIME. In this way, a time is detected.

In some cases, in real life situations it is possible to detect two different types of information (eg TIME and BUG_IDENTIFICATION) from the same sequence of characters, for example where the results are overlapping. For instance in the BUG_ID/TIME example, consider the character sequences "AM12" in "AM123". Within "AM123" we could recognize both a time (characters 1 to 4), and a bug identification code (characters 1 to 5). In such an event, it is common practice to provide an additional filter to determine which of the two detected types of information is more likely to be the correct one. One commonly-used heuristic that has proven efficient is to keep only the longest result—in this case, the bug identification code.

As another example, the parser may be provided with the grammar
ADDRESS:=name? company? street Accordingly, to detect an address, it is only necessary for a street to be present, a name and/or a company in front of the street being optional. Thus, an epsilon reduction is required for both the name and company. Using the tokens a, b and, c, the grammar can be rewritten as
a:=name|ε
b:=company|ε
c:=street
ADDRESS:=abc FIG. 6 shows a corresponding decision tree for the parser 20, which determines that an address has been detected when it reaches state F. In this case, the fact that the "name" token is optional is handled by the path from the starting state S to state 1, the reduction for state 1 and the epsilon reduction for starting state S. Similarly, the fact that the "company" token is optional is handled by the path from state 2 to state 5, the reduction for state 5 and the epsilon reduction for state 2.

Such a methodology can be applied to many different types of grammar and data structures and has previously been found to be particularly successful in extracting predetermined types of data from sequences of characters. However, in view of the increasing calls on the processors of user and server computers to carry out numerous tasks (including data detection), combined with the increasing volume of information that needs to be scanned and the increasingly complex and numerous types of information it is desired to detect, it is desirable to increase the speed with which such data detection can be carried out.

SUMMARY OF THE DESCRIPTION

Method, systems and machine-readable storage media for processing a sequence of tokens are described. In one embodiment, a method for processing a sequence of tokens includes providing a tree for detecting predetermined data that has a structure that includes a predetermined sequence of token types and comparing the token types of the sequence of tokens to respective conditions in the tree to match the sequence of tokens to one or more paths in the tree. The predetermined data can, in one embodiment, be detected without an epsilon reduction to take into account of at least one optional token type. The tree includes a plurality of states, each being linked with at least one other state by a respective condition, and the arrangement of linked states form a plurality of paths. Other methods are also described, and systems and machine-readable storage media which perform these methods are also described.

BRIEF DESCRIPTION OF THE DRAWINGS

Embodiments of the present invention will now be described by way of further example only and with reference to the accompanying drawings, in which.

DETAILED DESCRIPTION

Figure 1:
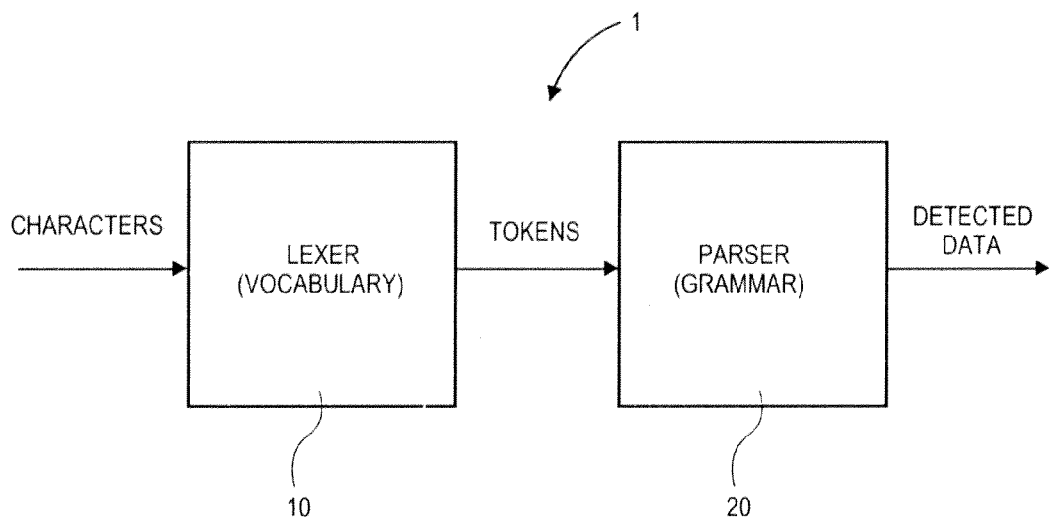
FIG. 1 is a schematic representation of a parsing apparatus.
Figure 2:
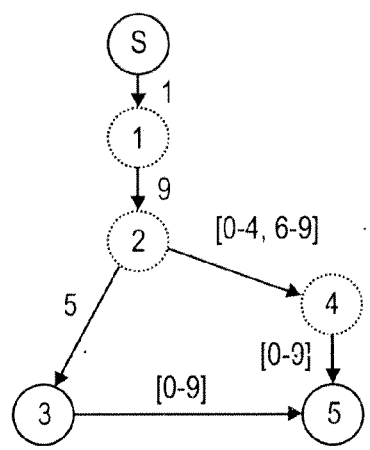
FIG. 2 shows a decision tree of a lexer according to the known art.

The present invention is generally related to lexing and parsing sequences of characters. In particular, some embodiments of the present invention related to the removal of epsilon reductions in lexing and parsing characters in order to improve the overall efficiency.

It is noted that where an optional token type is included, processing for that optional token will always use the same branch or path. Accordingly, in the example in FIG. 3, a path including the link S-2 (path S-2-3-4) is followed both when an 'a'-type token is included in the sequence of tokens being processed (acd) and when an 'a'-type token is not included (cd). Similarly, in FIG. 6 a path including the link S-2 (path S-2-3-4) is always followed both when the optional 'name' token type is included in the sequence (name company street; name street) and when it is not (company street; street). Again, in FIG. 6 a path including the link 2-3 (path S-2-3-4) is always followed both when the optional 'company' token type is included in the sequence (name company street; company street) and when it is not (name street; street). This appears an elegant and efficient way of processing data.

However, processing is particularly wasteful when the data to be detected does not exist within the sequence. For example, consider using the decision tree shown in FIG. 3 to attempt to detect an E in the sequence 'ged'. Since g is the first token type, none of the conditions of the starting state S is met. Accordingly, the epsilon reduction for the starting state S is used and an 'A' is added to the front of the sequence, so that the current sequence becomes 'Aged'. Subsequently, the 'A' is consumed and processing proceeds from state S to state 2. The condition for state 2 is not met and state 2 is represented by a dotted circle, which means that processing cannot end with at state. The branch therefore dies uselessly. It will be apparent that when scanning a large block of text, such wasted processing will occur a large number of times just to handle a single epsilon reduction in a query for a single, simple type of predetermined data. In real life examples, a huge amount of processing capacity is wasted in investigating such dying branches.

Figure 6:
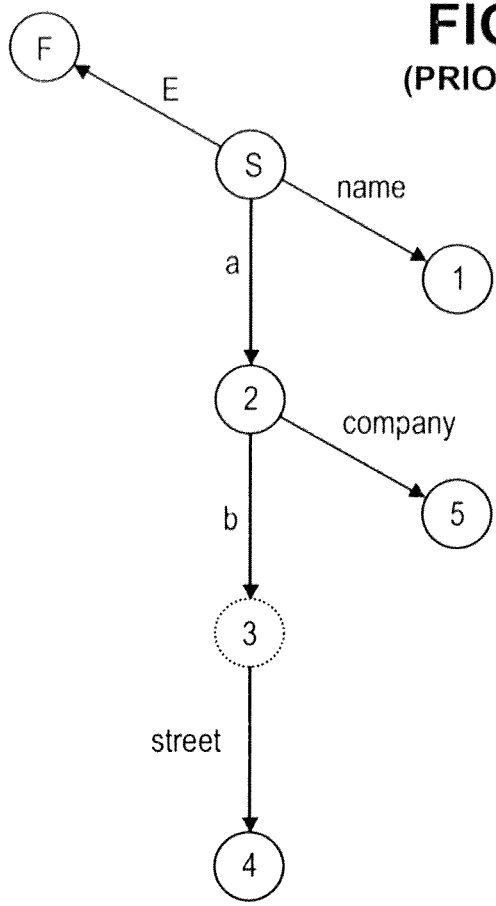
FIG. 6 shows another decision tree of another parser according to the known art.

Moreover, even when the type of data to be detected exists within the sequence of tokens being processed, processing is inefficient. In particular, it is necessary to convert the token from 'a' to an 'A', requiring the path from state S to state 5 and the reduction for state 5, and it is also necessary to provide the epsilon reduction at state S to pop up an 'A' in front of the current sequence according to the conventional approach. In either case, two lots of processing must take place—the initial processing to cope with the fact that the token type is optional, by revising the sequence to include an 'A' in it, and the subsequent processing to detect the data using the revised sequence. Thus, the conditions of state S must be checked against twice in the processing.

Where two or more epsilon reductions are included in a conventional decision tree, as shown in FIG. 6, the reduction in efficiency is significantly compounded.

Some embodiments of the present invention provide a solution to improve the efficiency of lexing and parsing, which are described below by way of example.

In some embodiments, the solution provided by the present invention is to remove epsilon reductions from the decision tree. More particularly, states are removed from the decision tree that produce an additional token without reverting to an earlier state (that is, without a token being consumed) when all of the conditions of that state are unmatched or lead to dying branches. This is achieved by instead providing an additional path in the tree, so that one path can directly be used to detect the required data when the token sequence includes the optional token type and another, separate path can directly be used to detect the required data when the token sequence does not include the optional token type.

Figure 3:
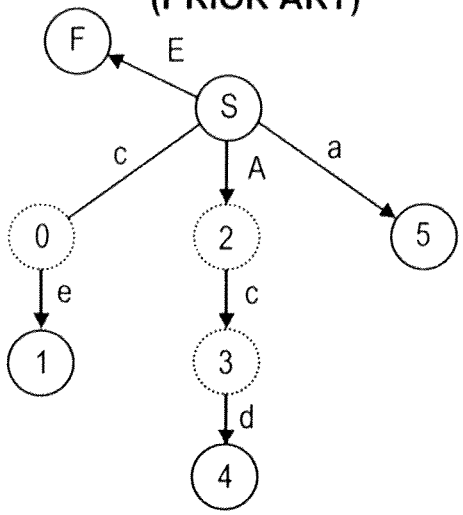
FIG. 3 shows a decision tree of a parser according to the known art.
Figure 4:
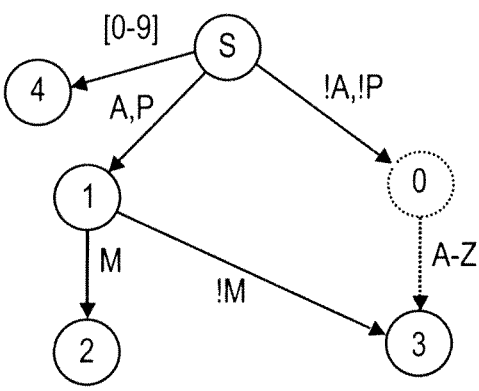
FIG. 4 shows a decision tree of another lexer according to the known art.
Figure 5:
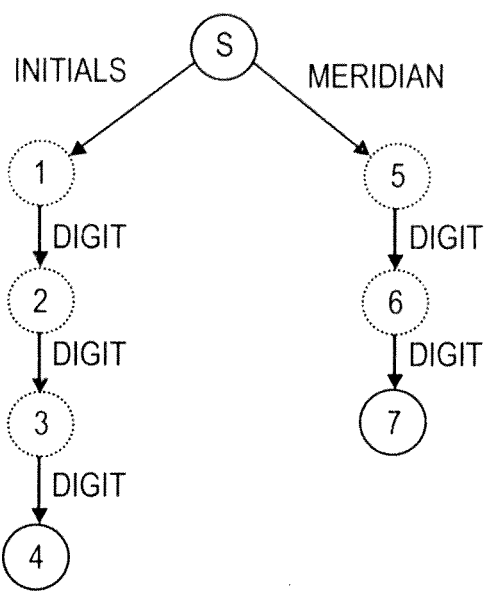
FIG. 5 shows a decision tree of another parser according to the known art.
Figure 7:
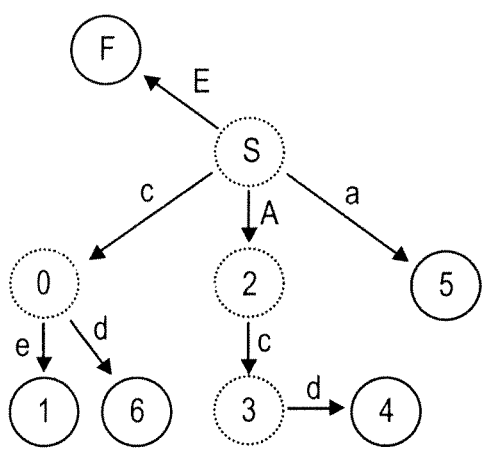
FIG. 7 shows a decision tree of a parser according to the present invention.

As an example, the decision tree of FIG. 3 modified in accordance with some embodiments of the present invention is shown in FIG. 7. Here it can be seen that the epsilon reduction for the starting state has been removed and instead a new path has been provided in the tree. The new path is formed by new state 6 and the link between it and state 0. To reach state 6, a new condition has been added to state 0. Moreover, the starting state is now represented by a dotted circle, indicating that processing cannot end there.

For example, if the decision tree used in FIG. 7 is used to process the token-type sequence 'cc', the following table represents the processing that takes place.

| Current state | Sequence to process | Previous states |
|---|---|---|
| S | ce | |
| 0 | e | S |
| 1 | | S, 0 |
| S | E | |
| F | | S |

Similarly, the token sequence 'acd' is processed using the parsing tree shown in FIG. 7 as shown in the following table:

| Current state | Sequence to process | Previous states |
|---|---|---|
| S | Acd | |
| 5 | Cd | S |
| S | Acd | |
| 2 | Cd | S |
| 3 | D | S, 2 |
| 4 | | S, 2, 3 |
| S | E | |
| F | | S |

However, the token sequence 'cd' is processed using the parsing tree shown in FIG. 7 as shown in the following table:

| Current state | Sequence to process | Previous states |
| --- | --- | --- |
| S | cd | |
| 0 | d | S |
| 6 | | S, 0 |
| S | E | |
| F | | S |

Here, proceeding from the start state S, the parser 20 consumes a 'c' and proceeds to state 0, and then consumes a 'd' and proceeds to state 6 rather than state 1. State 6 allows processing to finish with the reduction to go back two states and replace the consumed letters by an 'E'. Processing then returns to the start state S, where the E is processed. The E is consumed as processing proceeds to the finish state F. Thus, the token sequence 'ce' is parsed as having the grammatical or data type E.

It can immediately be seen how processing is made more efficient by the above embodiments of the present invention. In particular, for each possible sequence of tokens that can form the structure of data E, a path is provided that leads directly to the data being detected. Accordingly, it is not necessary to produce an additional 'A' at the front of sequence in order to allow for the fact that an 'a'-type token can but need not be included in the sequence. Note that where the sequence of tokens makes up the data to be detected, the data is detected much faster.

Importantly, where the sequence of tokens does not include the data to be detected, since there is no epsilon reduction at the starting state, it is immediately detected that the data is not present. For example, if the sequence 'gcd' is processed, the first token in the sequence ('g') does not match any of the conditions of the starting state and so is discarded. Starting state S is now represented by a dotted line and no longer has a reduction associated with it. Accordingly, none of previous processing (of performing the epsilon reduction for the starting state S to add an 'A' to the front of the sequence, proceeding from state S to state 2, and recognizing that the condition for state 2 is not met) takes place. Consequently, a huge amount of processing is saved by avoiding the investigation of dying branches.

In some embodiments, the removal of the epsilon reduction from the starting state allows further efficiency gains. Specifically, the path from the starting state S to state 5 and the reduction of state 5 can be removed simply by changing the condition associated with the path from state S to state 2 to require an 'a' instead of an 'A'. Once state 5 and its associated reduction are removed from the decision tree shown in FIG. 7, it can be seen that the total number of states is 8 (including states S and F) and the total number of reductions is 3. This compares with 8 states and 4 reductions in FIG. 3. Accordingly, in this example, not only is data detection considerably faster, the size of the cache required to store the tree is also reduced.

Figure 8:
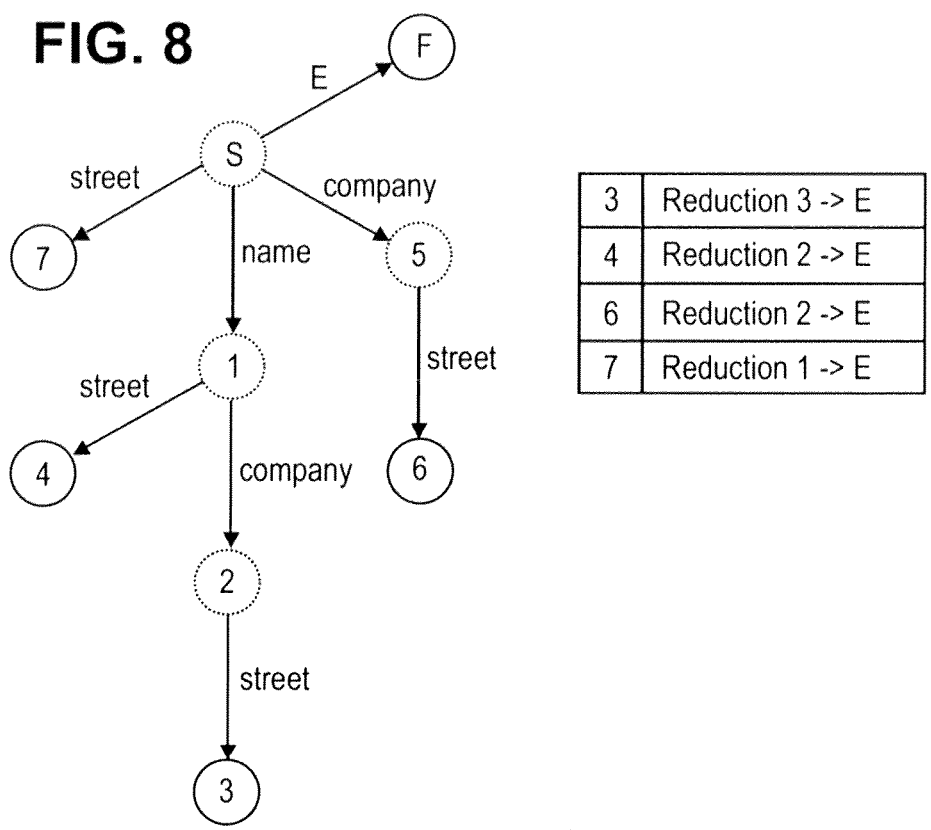
FIG. 8 shows a further decision tree according to the present invention.

FIG. 8 shows how the decision tree in FIG. 6 can be improved in line with some embodiments of the present invention. In FIG. 8 the epsilon reductions for both starting state S and starting state 2 are again removed. In their place, a direct path is provided for each of the case where an optional token type is present and the case where it is not. Thus, a path is provided for the case where a 'name' token is present—a path including the link S-1 followed by any other states. Moreover, since the 'company' token is optional, two paths are provided for the path where the 'name token' is not present—the path including the link S-7 and the path including the link S-5.

In the same way, at least two paths are provided for the case where the 'company' token is present—a path including the link S-5 and a path including the link 1-2. Moreover, at least two paths are provided for the case where the 'company' token is not present—a path including the link S-7 and a path including the link 1-4. It will be apparent that several of the paths provided to handle the optionality of the 'company' token correspond with the paths provided to handle the optionality of the 'name' token.

In common with the previous example, no state has an epsilon reduction and if data type E is included in a sequence of characters, it will always be detected by taking a single path straight through the tree according to some embodiments of the present invention. Again, if none of the conditions of the start state is matched, processing immediately ceases. This processing is highly efficient and extremely rapid compared with the prior art.

Figure 9:
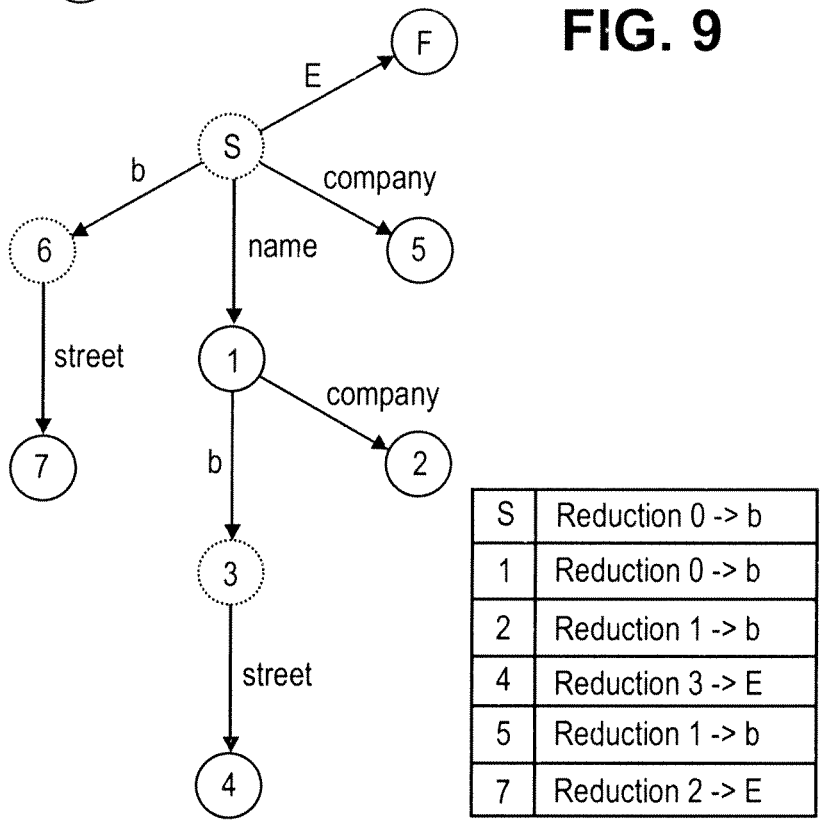
FIG. 9 shows a yet further decision tree according to the present invention.

However, the present invention is not limited to the removal of epsilon reductions from all states, or even from the starting state. As an example, FIG. 9 shows a different way in which the decision tree in FIG. 6 can be improved in line with some embodiments of the present invention. In FIG. 9, the epsilon reduction for the optional 'name' token is removed. Thus, a path is provided for the case where a 'name' token is present—a path including the link S-1 followed by any other states. Moreover, since the 'company' token is optional, two paths are provided for the path where the 'name token' is not present—a path including the link S-5 and a path including the link S-6. However, in this example the epsilon reduction for the optional 'company' token is maintained. Indeed, two 'company' epsilon reductions are provided—one for the case where the 'name' token is present and one for the case where the 'name' token is not present.

Figure 10:
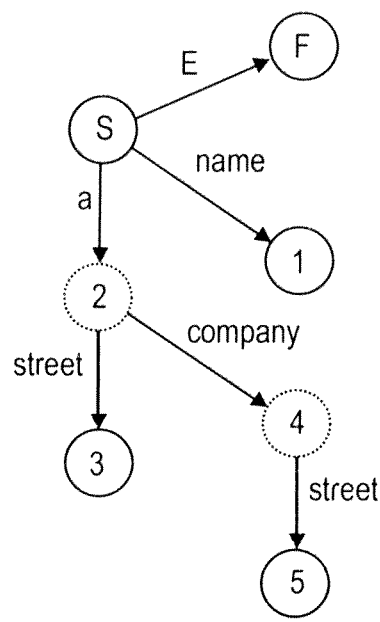
FIG. 10 shows a still further decision tree according to the present invention.

FIG. 10 shows a yet further way in which the decision tree in FIG. 6 can be improved in line with some embodiments of the present invention. Specifically, in FIG. 10 the epsilon reduction for the optional 'company' token is removed and separate paths are provided for the cases where the optional 'company' token is and is not present—a path including the link 2-4 and a path including the link 2-3 respectively.

In summary, in some embodiments of the present invention, at least one epsilon reduction is removed for the case where a data structure includes at least one optional token type. Furthermore, an epsilon reduction at the starting state may be removed. In this case, if one of the starting state conditions is not met, it is immediately determined that the sequence does not include the type of data being searched for.

In some embodiments, for a data structure having a predetermined sequence of token types, at least one of which is optional, a path is provided in the tree for the predetermined sequence including the optional token type and a separate path is provided for the predetermined sequence without the optional token type. Thus, it is possible to detect predetermined data in a sequence of tokens without adding a token to the sequence to take account of an optional token type.

In some embodiments, where the sequence is revised by adding a token to the beginning of the sequence and then comparing the revised sequence with the condition or conditions of the same state, the association of a reduction with any state is prohibited.

Embodiments of the present invention has a wide variety of applications. For example, it may be used in scanning e-mails and blocks of text, such as those created in word processing packages. Moreover, it can be used in any application where sequences of characters are processed, such as in compilers and interpreters. Embodiments of the present invention may be implemented using any suitable apparatus. Such an apparatus may include, but is not limited, to data processing machines and devices, for example laptop or notebook computers, other user and server computers, and mobile communications devices, such as mobile telephones, personal digital assistants and so forth.

Figure 11:
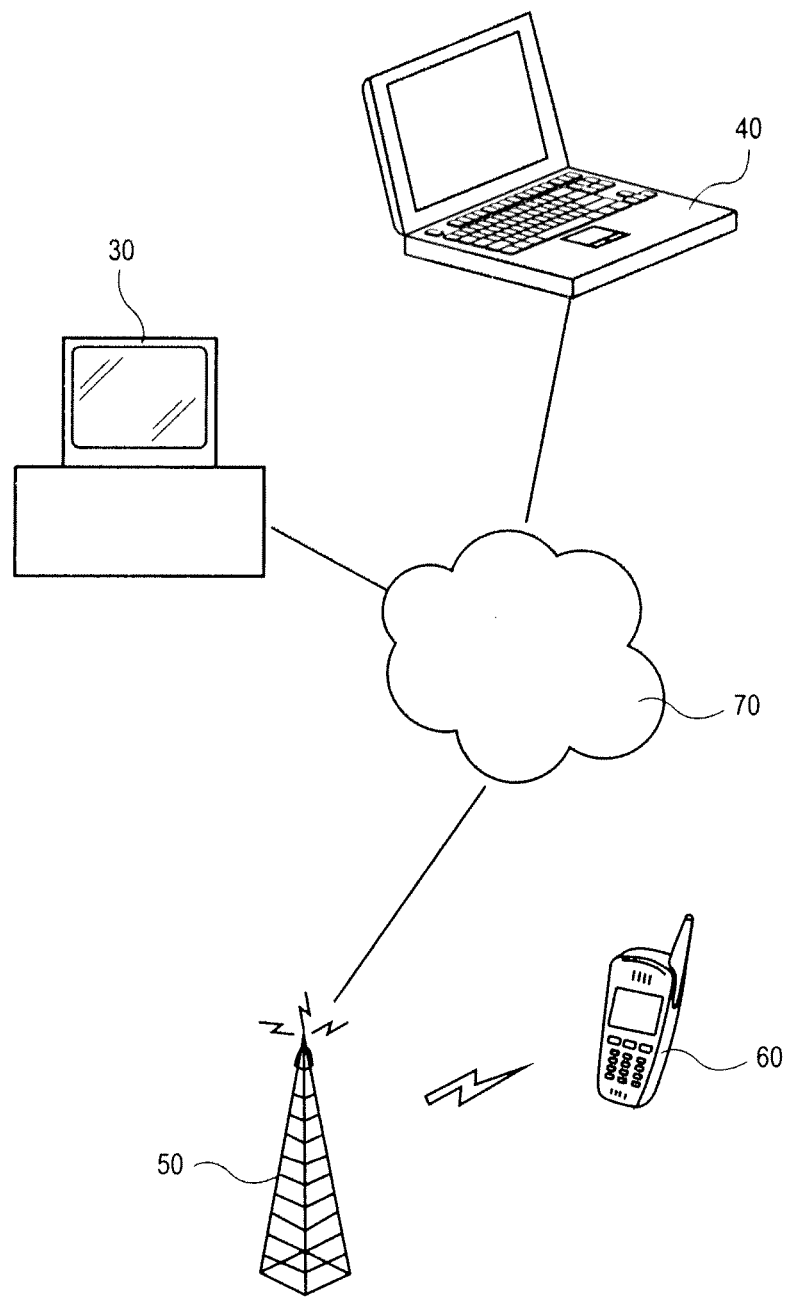
FIG. 11 shows a system in the present invention.

As an example, FIG. 11 shows an arrangement comprising a user computer 30, a notebook computer 40, and a cell phone 60, where one, some or all devices may have a processor 1 adapted to operate in accordance with the present invention. In the present example, at least the notebook computer 40 and the cell phone 60 have such a processor 1. A first user may compose a message and send it by e-mail to a second user. The second user may retrieve the message over the Internet 70 using his notebook computer 40. Upon retrieval of the message, an application embodying one embodiment of the present invention may automatically scan the message to detect whether it includes predetermined data, such as a time, a date, a name, an address and so forth. On detection of a time and a date, the application may notify the second user and provide him with the option of updating his calendar. Similarly, on detection of names, addresses, phone numbers and so forth, the application may notify the second user and provide him with the option of updating his address book. In addition, the second user may retrieve the message using his mobile phone 60 via the Internet 70 and a telecommunications base station 50. Again, an application embodying the present invention may detect predetermined data and provide the option of updating the user's records with the detected data.

It is also conceived that the present invention may be embodied using two or more different devices in some embodiments. For example, one device could carry out the lexing function and the other the parsing function.

The present invention may also be used to extract data included in mobile phone messages, such as SMS text message and MMS messages, in some embodiments.

The present invention may also be embodied in software causing a data processing device to carry out the invention, as well as in computer-readable media on which such software is stored. Moreover, the present invention may be embodied in dedicated hardware or general-purpose hardware.

The present invention can relate to an apparatus for performing one or more of the operations described herein. This apparatus may be specially constructed for the required purposes, or it may comprise a general-purpose computer selectively activated or reconfigured by a computer program stored in the computer. Such a computer program may be stored in a machine (e.g. computer) readable storage medium, such as, but is not limited to, any type of disk including floppy disks, optical disks, CDROMs, and magneticoptical disks, readonly memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus.

Figure 12:
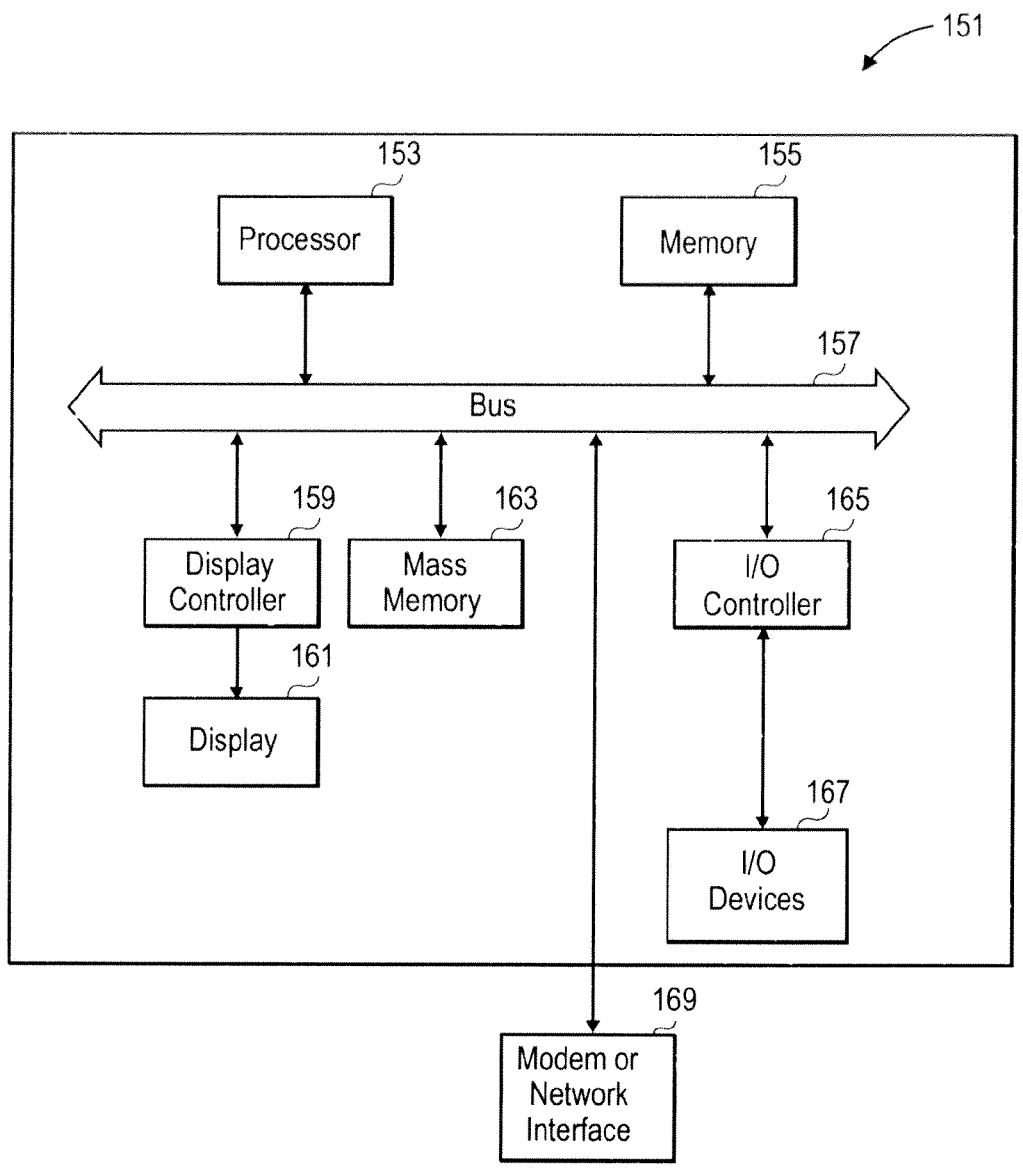
FIG. 12 shows one embodiment of a computer system.

FIG. 12 shows one example of a data processing system, such as a computer system, which may be used with present invention. Note that while this figure illustrates various components of a data processing system, it is not intended to represent any particular architecture or manner of interconnecting the components as such details are not germane to the present invention. It will also be appreciated that network computers, personal digital assistants (PDAs), cellular telephones, handheld computers, special purpose computers, entertainment systems and other data processing systems and consumer electronic devices which have fewer components or perhaps more components may also be used with the present invention. The system of this figure may, for example, be a Macintosh computer from Apple Inc.

In some embodiments, the computer system 151 may be used as a server computer system or as a client computer system or as a web server computer system. It will be appreciated that such a computer system may be used to perform many of the functions of an Internet service provider, such as ISP 105. The computer system 151 interfaces to external systems through a modem or network interface 169. It will be appreciated that the modem or network interface 169 may be considered part of the computer system 151. This network interface 169 may be an analog modem, an ISDN modem, a cable modem, a token ring interface, a satellite transmission interface (e.g. "Direct PC"), or other interfaces for coupling a digital processing system to other digital processing systems. The computer system 151 includes a processor 153 which may be a conventional microprocessor, such as a Motorola PowerPC microprocessor or an Intel Pentium microprocessor. Memory 155 is coupled to the processor 153 by the bus 157. Memory 155 may be dynamic random access memory (DRAM) and may also include static RAM (SRAM). The bus 157 couples the processor 153 to the memory 155 and also to mass memory 163 and to display controller 159 and to the I/O (input/output) controller 165. Display controller 159 controls in the conventional manner a display on the display device 161 which may be a CRT or a liquid crystal display device. The input/output devices 169 may include a keyboard, disk drives, printers, a scanner, a digital camera, and other input and output devices, including a mouse or other pointing device. The display controller 159 and the I/O controller 165 may be implemented with conventional well known technology. The mass memory 163 is often a magnetic hard disk, an optical disk, or another form of storage for large amounts of data. Some of this data is often written, by a direct memory access process, into memory 155 during execution of software in the computer system 151. It will be appreciated that the computer system 151 is one example of many possible computer systems which have different architectures. For example, Macintosh or Wintel systems often have multiple busses, one of which may be considered to be a peripheral bus. Network computers may also be considered to be a computer system which may be used with the present invention. Network computers may not include a hard disk or other mass storage, and the executable programs are loaded from a network connection into the memory 155 for execution by the processor 153. A Web TV system, which is known in the art, may be considered to be a computer system according to the present invention, but it may not include certain features shown in FIG. 12, such as certain input or output devices. A cell phone having a suitable display and a processor and memory may also be considered to be a digital processing system or a computer system, which may be used with the present invention. A typical computer system usually include at least a processor, memory, and a bus coupling the memory to the processor. It will also be appreciated that the computer system 151 is typically controlled by an operating system, which includes a file management system, such as a disk operating system, which is part of the operating system software.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, or other form of storage systems.

It will be apparent from this description that aspects of the inventions may be embodied, at least in part, in software. That is, the techniques may be carried out in a computer system or other data processing system in response to its processor or processing system executing sequences of instructions contained in a memory, such as RAM, etc. In various embodiments, hardwired circuitry may be used in combination with the software instructions to implement the present inventions. Thus, the techniques are not limited to any specific combination of hardware circuitry and software, nor to any particular source for the instructions executed by the data processing systems.

The foregoing description has been given by way of example only and it will be appreciated by a person skilled in the art that modifications can be made without departing from the spirit and scope of the present invention.

The invention claimed is:

1. A non-transitory machine readable storage medium storing executable program instructions, which, when executed cause a data processing system to perform a method to detect predetermined electronic data from a sequence of tokens, the method comprising:
   storing, in a memory, electronic data indicative of a tree having a plurality of states, at least one of said plurality of states being associated with an epsilon reduction, each said token having a token type, and the predetermined electronic data having a structure that comprises a predetermined sequence of token types, including at least one optional token type;
   removing, by a processor of the data processing system, the epsilon reduction from the tree and adding at least one additional state to form an additional path in the tree; and
   comparing, by the processor of the data processing system, the tokens with the additional path in the tree to detect the predetermined electronic data when the token sequence does not include the optional token type and comparing the tokens with another path in the tree to detect the predetermined electronic data when the token sequence includes the optional token type.

2. The medium as in claim 1, wherein the method further comprises:
   adding a path in the tree for the predetermined electronic data without the optional token type.

3. The medium as in claim 1, wherein the predetermined electronic data is indicative of at least one of a physical address, an internet protocol (IP) address, an e-mail address, a time, a day, a date, or a contact number.

4. The medium as in claim 1, wherein the predetermined electronic data can be detected without using an epsilon reduction to take account of at least one said optional token type.

5. The medium as in claim 2, wherein the predetermined electronic data is indicative of at least one of a physical address, an IP address, an e-mail address, a time, a day, a date, or a contact number.

6. The medium as in claim 3, wherein each of said plurality of states is linked with at least one other state of said plurality of states by a respective condition and wherein an arrangement of linked states forms a plurality of paths in the tree.

7. The medium as in claim 3, wherein the predetermined electronic data is extracted from one of a mobile phone message, an SMS text message or an MMS message.

8. A data processing system to detect predetermined electronic data from a sequence of tokens, the system comprising:
   means for storing, in a memory, a tree having a plurality of states, at least one of said plurality of states being associated with an epsilon reduction, each said token having a token type, and the predetermined electronic data having a structure that comprises a predetermined sequence of token types, including at least one optional token type;
   means for removing the epsilon reduction from the tree and adding at least one additional state to form an additional path in the tree; and
   means for comparing, in the data processing system, the tokens with the additional path in the tree to detect the predetermined electronic data when the token sequence does not include the optional token type and comparing the tokens with another path in the tree to detect the predetermined electronic data when the token sequence includes the optional token type.

9. The system as in claim 8, wherein the system further comprises:
   means for adding a path in the tree for the predetermined electronic data without the optional token type.

10. The system as in claim 8, wherein the predetermined electronic data is indicative of at least one of a physical address, an internet protocol (IP) address, an e-mail address, a time, a day, a date, or a contact number.

11. The system as in claim 8, wherein the predetermined electronic data can be detected without using an epsilon reduction to take account of at least one said optional token type.

12. The system as in claim 9, wherein the predetermined electronic data is indicative of at least one of a physical address, an IP address, an e-mail address, a time, a day, a date, or a contact number.

13. The system as in claim 10, wherein each of said plurality of states is linked with at least one other state of said plurality of states by a respective condition and wherein an arrangement of linked states forms a plurality of paths in the tree.

14. The system as in claim 10, wherein the predetermined electronic data is extracted from one of a mobile phone message, an SMS text message or an MMS message.

* * * * *